United States Patent
Asghari et al.

(10) Patent No.: US 12,066,541 B2
(45) Date of Patent: Aug. 20, 2024

(54) IMAGING SYSTEM HAVING MULTIPLE CORES

(71) Applicant: SiLC Technologies, Inc., Monrovia, CA (US)

(72) Inventors: Mehdi Asghari, La Canada Flintridge, CA (US); Uttam Paudel, La Palma, CA (US); Behnam Behroozpour, South San Francisco, CA (US); George Nikolaev Guentchev, Irvine, CA (US)

(73) Assignee: SiLC Technologies, Inc., Monrovia, CA (US)

( * ) Notice: Subject to any disclaimer, the term of this patent is extended or adjusted under 35 U.S.C. 154(b) by 260 days.

(21) Appl. No.: 17/829,328

(22) Filed: May 31, 2022

(65) Prior Publication Data
US 2023/0228878 A1   Jul. 20, 2023

Related U.S. Application Data

(63) Continuation-in-part of application No. 17/580,623, filed on Jan. 20, 2022, now Pat. No. 11,982,748.

(51) Int. Cl.
*G01S 17/89*   (2020.01)
*G01S 17/58*   (2006.01)

(52) U.S. Cl.
CPC .............. *G01S 17/89* (2013.01); *G01S 17/58* (2013.01)

(58) Field of Classification Search
CPC ................................ G01S 17/58; G01S 17/89
See application file for complete search history.

(56) References Cited

U.S. PATENT DOCUMENTS

| | | |
|---|---|---|
| 8,213,751 B1 | 7/2012 | Ho et al. |
| 8,311,374 B2 | 11/2012 | Hochberg et al. |

(Continued)

FOREIGN PATENT DOCUMENTS

| | | |
|---|---|---|
| JP | 2018188284 A | 11/2018 |
| WO | 2019/010320 A1 | 1/2019 |

(Continued)

OTHER PUBLICATIONS

Shane, Thomas, International Search Report and Written Opinion, International Searching Authority, United States Patent and Trademark Office, PCT/US2023/011183, May 17, 2023.

(Continued)

*Primary Examiner* — Maurice C Smith
(74) *Attorney, Agent, or Firm* — Gavrilovich, Dodd & Lindsey LLP

(57) ABSTRACT

The imaging system includes a photonic circuit chip having multiple cores. Each of the cores includes an optical switch and multiple alternate waveguides. The optical switch in each core is configured to direct an outgoing light signal to any one of the alternate waveguides, the alternate waveguide to which the outgoing light signal is directed being an active waveguide. Each core outputs the outgoing LIDAR signal from the active waveguide while receiving an incoming LIDAR signal that includes light from the outgoing LIDAR signal, has exited from the imaging system, and has returned to the imaging system. Each core includes a signal splitter that receives the outgoing LIDAR signal and the incoming LIDAR signal. The signal splitter extracts a portion of the outgoing LIDAR signal that serves as a reference signal and at least a portion of the incoming LIDAR signal that serves as a comparative signal. Each core includes a signal combiner that combines light from the reference signal with light from the comparative signal so as to generate a composite (Continued)

signal beating at a beat frequency. Electronics calculate LIDAR data for each core from the beat frequency of the composite signal generated by the core.

17 Claims, 9 Drawing Sheets

(56) References Cited

U.S. PATENT DOCUMENTS

| | | |
|---|---|---|
| 11,170,476 B1 | 11/2021 | Toshniwal et al. |
| 11,448,729 B2 | 9/2022 | Baba et al. |
| 2010/0187442 A1 | 7/2010 | Hochberg et al. |
| 2014/0376001 A1 | 12/2014 | Swanson |
| 2015/0346340 A1 | 12/2015 | Yaacobi et al. |
| 2015/0378187 A1 | 12/2015 | Heck et al. |
| 2017/0184450 A1 | 6/2017 | Doylend et al. |
| 2017/0207600 A1 | 7/2017 | Klamkin et al. |
| 2017/0269215 A1 | 9/2017 | Hall et al. |
| 2017/0299697 A1 | 10/2017 | Swanson |
| 2017/0350965 A1 | 12/2017 | Schmalenberg |
| 2017/0371227 A1 | 12/2017 | Skirlo et al. |
| 2018/0024246 A1 | 1/2018 | Jeong et al. |
| 2018/0143322 A1 | 5/2018 | Rosenzweig et al. |
| 2018/0172918 A1 | 6/2018 | Lane et al. |
| 2018/0188371 A1 | 7/2018 | Bao et al. |
| 2018/0306925 A1 | 10/2018 | Hosseini et al. |
| 2019/0257927 A1 | 8/2019 | Yao |
| 2020/0158830 A1* | 5/2020 | Asghari .................. H03K 3/00 |
| 2021/0149056 A1* | 5/2021 | Luff ....................... G01S 17/931 |
| 2021/0159664 A1 | 5/2021 | Liu et al. |
| 2021/0349216 A1* | 11/2021 | Behroozpour .......... G01S 17/88 |
| 2022/0413143 A1 | 12/2022 | Parsa et al. |
| 2023/0027271 A1 | 1/2023 | Jin et al. |

FOREIGN PATENT DOCUMENTS

| | | | |
|---|---|---|---|
| WO | WO-2019217857 A1 * | 11/2019 | ............. G01S 17/34 |
| WO | 2020/251633 A2 | 12/2020 | |

OTHER PUBLICATIONS

Poulton, Christopher V., "Coherent solid-state LIDA with silicon photonic optical phased arrays", Oct. 5, 2017, vol. 42, No. 20, pp. 4091-4094.

Smith, Maurice C., Notice of Allowance, United States Patent and Trademark Office, U.S. Appl. No. 17/580,623, Dec. 5, 2023.

Guo et al., "Beat-frequency adjustable Er3+-doped DBR fiber laser for ultrasound detection", Optics Express, Jan. 31, 2011, vol. 19, No. 3, pp. 2485-2492.

Matos, Taina, International Search Report and Written Opinion, International Searching Authority, United States Patent and Trademark Office, PCT/US2023/023782, Aug. 25, 2023.

Royo et al., "An Overview of LIDAR Imaging Systems for Autonomous Vehicles", Appl. Sci., Sep. 30, 2019, 9(19):4093, 37 pages. https://doi.org/10.3390/app9194093.

* cited by examiner

IMAGING SYSTEM HAVING MULTIPLE CORES

RELATED APPLICATIONS

This application is a Continuation-in-Part of U.S. patent application Ser. No. 17/580,623, filed on Jan. 20, 2022, entitled "Imaging System Having Multiple Cores," and incorporated herein in its entirety.

FIELD

The invention relates to optical devices. In particular, the invention relates to LIDAR systems.

BACKGROUND

The performance demands placed on optical imaging systems is increasing as these systems support an increasing number of applications. Optical imaging systems generally generate data for a series of sample regions that are each sequentially illuminated by a system output signal. The data for a sample region indicates the radial velocity and/or distance between the imaging system and one or more objects located in the sample region. The imaging system can scan the system output signal to multiple different sample regions. The sample regions can be stitched together to form a field of view for the imaging system. As a result, the combination of data from the different sample regions provides the data for objects within the field of view.

Increasing the rate at which the data can be generated for the field of view can increase the frequency that the field of view can be scanned, can increase the size of the field of view, and/or can increase the resolution for the field of view. LIDAR systems that have been designed to increase the data generation rate and/or the resolution employ a circulator that separates light that is exiting from the LIDAR system from light that is returning to the LIDAR system. However, these circulators add costs and assembly complexity to the LIDAR system. As a result, there is a need for a LIDAR system that can provide the desired data generation rate and/or resolution without the use of a circulator.

SUMMARY

An imaging system includes a photonic circuit chip having multiple cores. Each of the cores includes an optical switch and multiple alternate waveguides. The optical switch in each core is configured to direct an outgoing light signal to any one of the alternate waveguides, the alternate waveguide to which the outgoing light signal is directed being an active waveguide. Each core outputs the outgoing LIDAR signal from the active waveguide while receiving an incoming LIDAR signal that includes light from the outgoing LIDAR signal, has exited from the imaging system, and has returned to the imaging system. Each core includes a signal splitter that receives the outgoing LIDAR signal and the incoming LIDAR signal. The signal splitter extracts a portion of the outgoing LIDAR signal that serves as a reference signal and at least a portion of the incoming LIDAR signal that serves as a comparative signal. Each core includes a signal combiner that combines light from the reference signal with light from the comparative signal so as to generate a composite signal beating at a beat frequency. Electronics calculate LIDAR data for each core from the beat frequency of the composite signal generated by the core.

BRIEF DESCRIPTION OF THE FIGURES

FIG. 3A is a schematic of an example of a suitable optical-to-electrical assembly for use in the processing component.

FIG. 3B provides a schematic of the relationship between electronics and the optical-to-electrical assembly of FIG. 3A.

FIG. 5A is a topview of the optical switch.

FIG. 5B is a cross section of the optical switch shown in FIG. 5A taken along the line labeled B in FIG. 5A.

DESCRIPTION

The imaging system includes a photonic circuit chip that has multiple cores. Each of the cores includes an optical switch and multiple alternate waveguides. The optical switch in each core is configured to direct an outgoing light signal to any one of the alternate waveguides, the alternate waveguide to which the outgoing light signal is directed serves as an active waveguide. Each core outputs the outgoing LIDAR signal from the active waveguide while also receiving an incoming LIDAR signal. The incoming LIDAR signal includes light from the outgoing LIDAR signal that has exited from the imaging system and has returned to the imaging system. Each core includes a signal splitter that receives the outgoing LIDAR signal and the incoming LIDAR signal. The signal splitter extracts a portion of the outgoing LIDAR signal to serve as a reference signal and also extracts at least a portion of the incoming LIDAR signal to serve as a comparative signal. Each core includes a signal combiner that combines light from the reference signal with light from the comparative signal so as to generate a beating signal beating at a beat frequency. Electronics calculate LIDAR data for each core from the beat frequency of the beating signal generated by the core. Since the beating signal is generated from light signals that are separated by the signal splitter, a circulator is not needed. The removal of the circulator reduces the costs and assembly complexity associated with the LIDAR system.

Figure 1A:
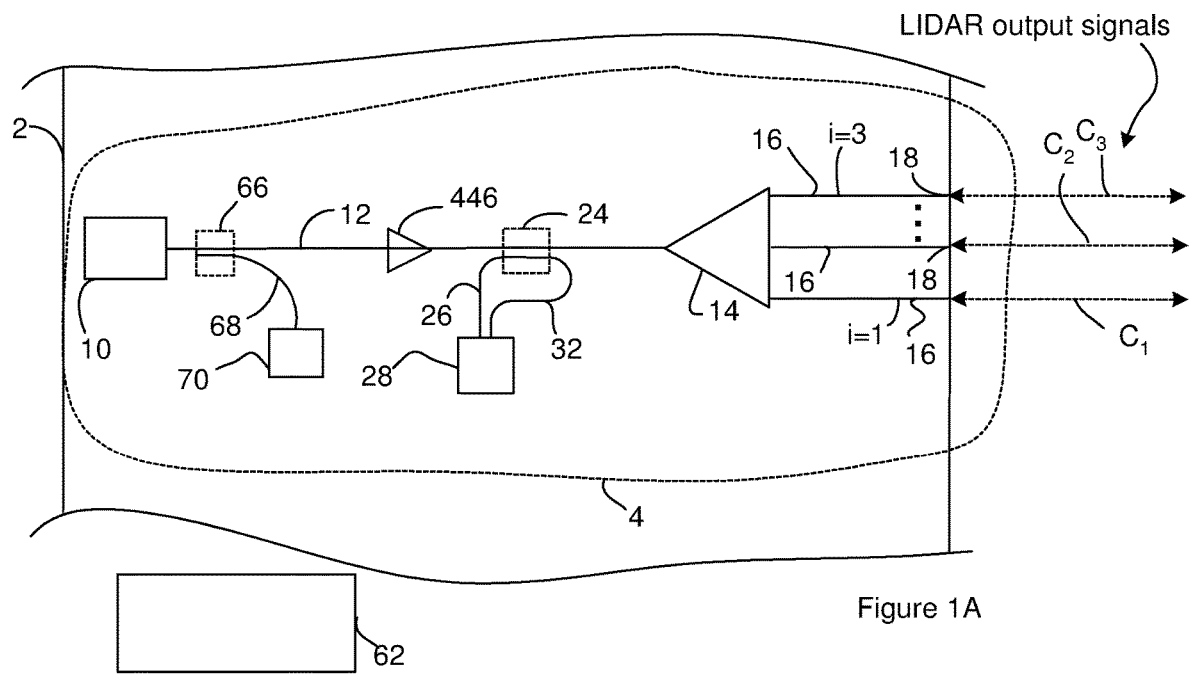
FIG. 1A illustrates an imaging system that includes a chip with a photonic circuit.

FIG. 1A is a schematic of a portion of a LIDAR system that includes a LIDAR chip 2. FIG. 1A includes a topview of a portion of the LIDAR chip 2. The LIDAR chip includes a LIDAR core 4. The LIDAR core 4 includes a photonic integrated circuit.

The LIDAR core 4 can include a light source 10 that outputs an outgoing LIDAR signal. The LIDAR core includes a utility waveguide 12 that receives the outgoing LIDAR signal from the light source 10. The utility waveguide 12 carries the outgoing LIDAR signal to a signal directing component 14. The signal directing component 14 can be operated by electronics so as direct light from the light source output signal to one of multiple different alternate waveguides 16. There are N alternate waveguides and each of the alternate waveguides 16 is associated with an alternate waveguide index i where i has a value from 1 to N. Suitable values of N include, but are not limited to, values less than 128, 64, or 32 and/or greater than 2, 8, or 16. In one example, N is between 2 and 128.

Each of the alternate waveguides 16 can receive the outgoing LIDAR signal from the signal directing component 14. When any of the alternate waveguides 16 receives the outgoing LIDAR signal, the alternate waveguides 16 serves an active waveguide and carries the outgoing LIDAR signal to a port 18 through which the outgoing LIDAR signal can exit from the LIDAR chip and serve as a LIDAR output signal. Accordingly, the outgoing LIDAR signal is output from the active waveguide.

Light signals that result from the outgoing LIDAR signal being directed to the alternate waveguide 16 with alternate waveguide index i are classified as light signals carrying channel ($C_i$). Accordingly, each of the LIDAR output signals is associated with a different one of the alternate waveguide indices channel index i=1 through N. For instance, the path of the LIDAR output signal that carries the channel with alternate waveguide index 2 is labeled $C_2$ in FIG. 1A. For the purposes of illustration, the LIDAR system is shown as generating three LIDAR output signals (N=3) labeled $C_1$ through $C_3$. Each of the different LIDAR output signals can carry a different channel, however, each of the different channels can carry the same selections of wavelength(s) or substantially the same selections of wavelength(s).

A LIDAR input signal returns to the LIDAR chip such that a LIDAR input signal carrying channel $C_i$ enters the alternate waveguide 16 that is associated with the same alternate waveguide index i. As a result, LIDAR input signals carrying different channels are directed to different alternate waveguides. The portion of the LIDAR input signal that enters an alternate waveguide 16 serves as an incoming LIDAR signal. As a result, the alternate waveguide that receives the incoming LIDAR signal can guides an outgoing LIDAR signal while also guiding the incoming LIDAR signal in the opposite direction. The alternate waveguide 16 that receives the incoming LIDAR signal carries the incoming LIDAR signal to the signal directing component 14. The signal directing component 14 outputs the incoming LIDAR signal on the utility waveguide 12.

The utility waveguide 12 carries the incoming LIDAR signal to a 2×2 splitter 24 that moves a portion of the incoming LIDAR signal from the utility waveguide 12 onto a comparative waveguide 26 as a comparative signal. The comparative waveguide 26 carries the comparative signal to a processing component 28 for further processing. Suitable splitters 24 include, but are not limited to, optical couplers, y-junctions, and MMIs. In some instances, the splitter 24 is configured such that the power of the incoming LIDAR signal is divided evenly or substantially evenly between the utility waveguide 12 and the comparative waveguide 26.

The utility waveguide 12 also carries the outgoing LIDAR signal to the splitter 24. The splitter 24 moves a portion of the outgoing LIDAR signal from the utility waveguide 12 onto a reference waveguide 32 as a reference signal. The reference waveguide 32 carries the reference signal to the processing component 28 for further processing.

As will be described in more detail below, the processing component 28 combines the comparative signal with the reference signal to form a composite signal that carries LIDAR data for a sample region on the field of view. Accordingly, the composite signal can be processed so as to extract LIDAR data (radial velocity and/or distance between a LIDAR system and an object external to the LIDAR system) for the sample region.

The LIDAR chip can include a control branch for controlling operation of the light source 10. The control branch includes a directional coupler 66 that moves a portion of the outgoing LIDAR signal from the utility waveguide 12 onto a control waveguide 68. The coupled portion of the outgoing LIDAR signal serves as a tapped signal. Although FIG. 1A illustrates a directional coupler 66 moving the portion of the outgoing LIDAR signal onto the control waveguide 68, other signal-tapping components can be used to move a portion of the outgoing LIDAR signal from the utility waveguide 12 onto the control waveguide 68. Examples of suitable signal tapping components include, but are not limited to, y-junctions, and MMIs.

The control waveguide 68 carries the tapped signal to control components 70. The control components can be in electrical communication with electronics 62. Although FIG. 1A illustrates the electronics as a component that is separate from the processing component(s) 28, a portion of the electronics can be included in each of the processing component(s) 28. During operation, the electronics 62 can adjust the frequency of the outgoing LIDAR signal in response to output from the control components. An example of a suitable construction of control components is provided in U.S. patent application Ser. No. 15/977,957, filed on 11 May 2018, entitled "Optical Sensor Chip," and incorporated herein in its entirety.

Figure 1B:
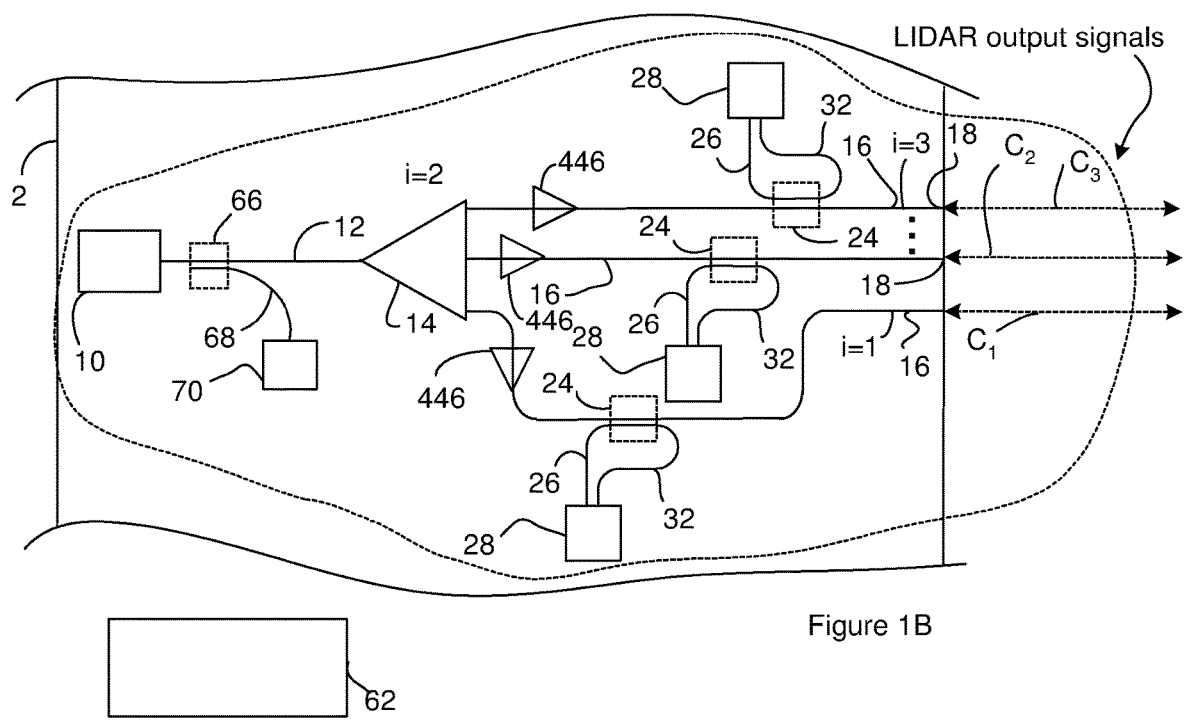
FIG. 1B illustrates another embodiment of an imaging system that includes a photonic circuit chip.

The incoming LIDAR signal passes through the signal directing component 14. The signal directing component 14 may be a source of optical loss. This source of optical loss can be removed by moving a portion of the incoming LIDAR signal that serves as the comparative signal onto the comparative waveguide 26 before the incoming LIDAR signal reaches the signal directing component 14. As an example, FIG. 1B illustrates the LIDAR chip of FIG. 1A modified such that a splitter 24 is located along each of the alternate waveguides 16 between the signal directing component 14 and the port 18. As a result, the comparative signal is extracted from the alternate waveguide 16 before the incoming LIDAR signal reaches the signal directing component 14.

Figure 1C:
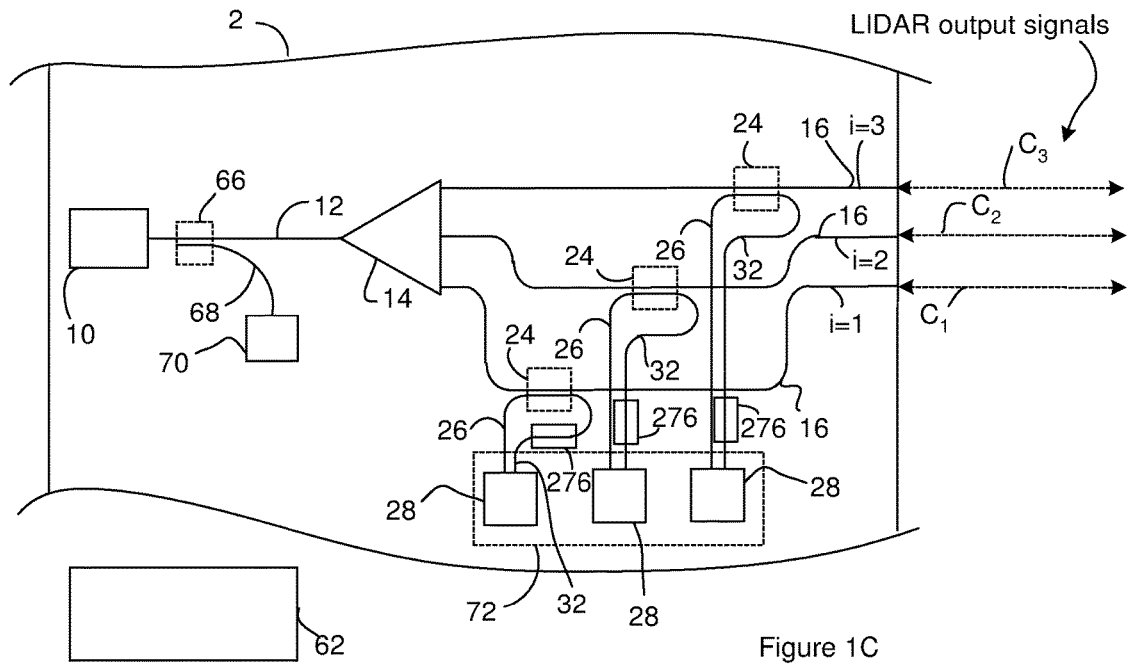
FIG. 1C illustrates another embodiment of an imaging system that includes a photonic circuit chip.

A comparison of FIG. 1A and FIG. 1B shows that the LIDAR chip of FIG. 1B requires more processing components 28 than the LIDAR chip of FIG. 1A. As will become evident below, increasing the required number of processing components 28 increases the number of Analog-to-Digital Converters required by the LIDAR system. However, a common processing component 28 can be used to reduce the number of Analog-to-Digital Converters. As an example, FIG. 1C illustrates the LIDAR chip of FIG. 1B modified such that each of the comparative waveguides 26 carries one of the comparative signals to a common processing component 72. Additionally, each of the reference waveguide 32 carries one of the reference signals to the common processing component 72.

Figure 2:
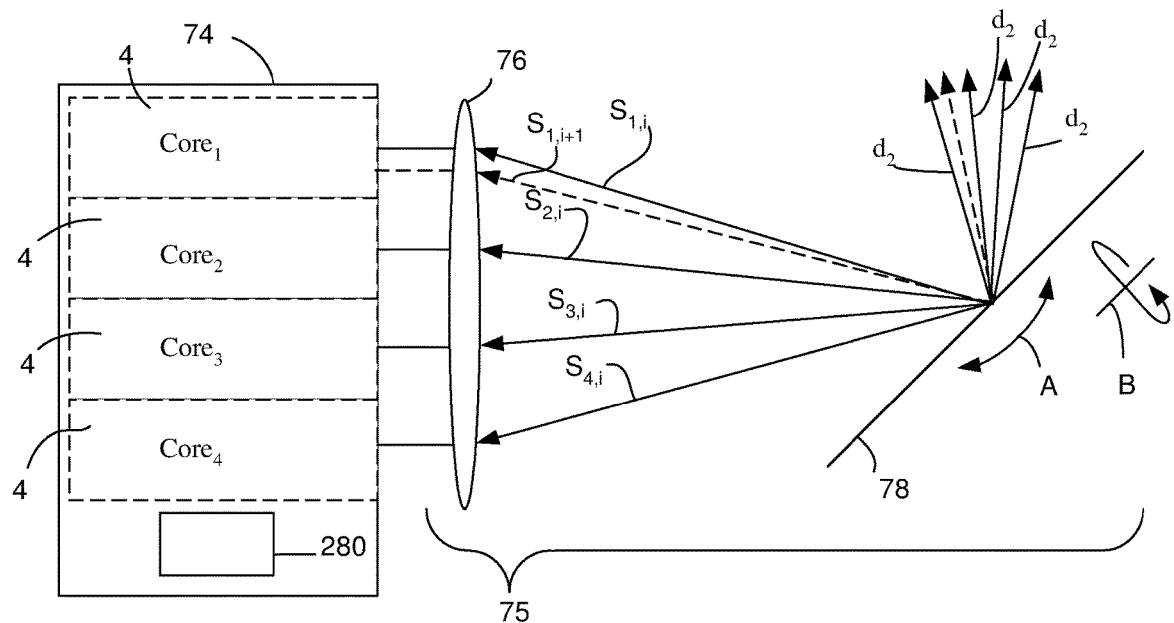
FIG. 2 is a schematic of an imaging system that includes multiple different cores on a chip.

A LIDAR system can include a LIDAR chip with multiple LIDR cores 4. As an example, FIG. 2 illustrates a LIDAR chip that includes multiple different cores. The cores are each labeled core$_k$ where k represents a core index k. Each of the LIDAR cores can be constructed as disclosed in the context of FIG. 1A through FIG. 1C or can have an alternate construction. Each of the LIDAR cores outputs a different LIDAR output signal. The LIDAR output signal output from the cores labeled core$_k$ can be represented by $S_{k,i}$ where i represents the channel index. As a result, $S_{k,i}$ is function of the alternate waveguide index i and the core index k. As an example, the LIDAR output signal represented by $S_{k,i}$ is output from core$_k$ and was received by alternate waveguide index i. Accordingly, the LIDAR output signal represented by $S_{k,i}$ is output from core$_k$ and carries channel $C_i$.

The LIDAR system can include an optical component assembly 75 that receives the LIDAR output signals from different cores and outputs system output signals that each includes, consists of, or consists essentially of light from a different one of the LIDAR output signals. The optical component assembly 75 can be operated by electronics 280 so as to steer the system output signals to different sample regions in the LIDAR system's field of view.

FIG. 2 illustrates an optical component assembly 75 that includes signal director 76 that receives each of the LIDAR output signal. The signal director 76 changes the direction that at least a portion of the LIDAR output signals are traveling and outputs each of the LIDAR output signal as a re-directed LIDAR output signal. Suitable signal directors 76 include, but are not limited to, convex lenses and concave mirrors. The optical component assembly 75 includes one or more beam steering components 78 that receive the re-directed LIDAR output signals output from the signal director 76 as system output signals. The direction that the system output signals travel away from the LIDAR system is labeled d$_2$ in FIG. 2. The electronics can operate the one or more beam steering components 78 so as to steer the each of the system output signal to different sample regions in a field of view. As is evident from the arrows labeled A and B in FIG. 2, the one or more beam steering components 78 can be configured such that the electronics can steer the system output signals in one dimension or in two dimensions. As a result, the one or more beam steering components 78 can function as a beam-steering mechanism that is operated by the electronics so as to steer the system output signals within the field of view of the LIDAR system. Suitable beam steering components 78 include, but are not limited to, movable mirrors, MEMS mirrors, optical phased arrays (OPAs), optical gratings, and actuated optical gratings. In some instances, the signal director 76 and/or the one or more beam steering components 78 are configured to operate on the system output signals such that the system output signals are collimated or substantially collimated as they travel away from the LIDAR system. Additionally or alternatively, the LIDAR system can include one or more collimating optical components (not illustrated) that operate on the LIDAR output signals, re-directed LIDAR output signals, and/or the system output signals such that the system output signals are collimated or substantially collimated as they travel away from the LIDAR system.

The system output signals can be reflected by an object located outside of the LIDAR system. All or a portion of the reflected light from a system output signal can return to the LIDAR system as a system return signal. Each of the system return signals is received at the one or more beam steering components 78. The one or more beam steering components 78 output at least a portion of each of the system return signals as a returned signal. The returned signals are each received at the signal director 76. The signal director 76 outputs at least a portion of each one of the retuned signals as a LIDAR input signal. Each of the different LIDAR input signals is received by a different one of the cores 4. Each of the LIDAR input signals includes or consists of light from the LIDAR output signal that was output from the core that receives the LIDAR input signal. Additionally, the LIDAR input signal received at an alternate waveguide includes or consists of the light from the LIDAR output signal that was output from the same alternate waveguide.

The one or more signal directors 76 can change the direction that a LIDAR output signal travels away from the one or more signal directors 76 such that the direction of a LIDAR output signal is different from the resulting re-directed LIDAR output signal. In some instances, the one or more signal directors 76 are selected such that all or a portion of the re-directed LIDAR output signal travel away from the one or more signal directors 76 in non-parallel directions. As an example, in FIG. 2, the one or more signal directors 76 is a lens and each of the different LIDAR output signals is incident on the lens at a different angle of incidence. As a result, the re-directed LIDAR output signals each travels away from the signal director 76 in a different direction. Further, the re-directed LIDAR output signals travel away from the signal director 76 in non-parallel directions. As is evident from FIG. 2, the different directions of the system output signals can result in the system output signals traveling away from the LIDAR system in different directions. In some instances, the system output signals travel away from the LIDAR system in non-parallel directions.

Operating the signal directing component 14 on a core can change where the LIDAR output signal is received by the one or more signal directors 76 and can accordingly change the direction that the system output signal that originates from that core travels away from the LIDAR system. As an example, the dashed line in FIG. 2 illustrates the result of operating the signal directing component 14 on core$_1$ such that the core outputs the LIDAR output signal represented by $S_{k,i+1}$ rather than the LIDAR output signal represented by $S_{k,i}$. As is evident from FIG. 2, this operation of the signal directing component 14 changes the direction that the system output signal output from core$_1$ travels away from the LIDAR system. As a result, the electronics can operate the signal directing components 14 on different cores so as to steer the system output signals within the LIDAR system's field of view. Accordingly, the electronics can operate the signal directing components 14 on different cores and/or the one or more beam steering components 78 so as to steer the system output signals within the LIDAR system's field of view. A suitable method of operating the signal directing components 14 on different cores and/or the one or more beam steering components 78 so as to steer the system output signals to different sample regions within the LIDAR system's field of view is disclosed in U.S. patent application Ser. No. 17/580,623, filed on Jan. 20, 2022, entitled "Imaging System Having Multiple Cores," and incorporated herein in its entirety.

The optical component assembly 75 can have configurations other than the configuration shown in FIG. 2. For instance, the one or more beam steering components 78 can be positioned between the signal director 76 and the LIDAR chip. Additionally, the optical component assembly 75 can include optical components that are not illustrated. For instance, the optical component assembly 75 can include one or more lenses configured to increase collimation of the LIDAR output signals and/or other signals derived from the LIDAR output signals and/or that include light from the LIDAR output signals.

The wavelength of the LIDAR output signal output from different cores can be same or different. As a result, the light source on different cores can be configured to output an outgoing light signal that each has a selection of wavelength that is different, the same or substantially the same. Accordingly, the selection of wavelengths in different system output signals can be different, the same or substantially the same.

All or a portion of the electronics 62 associated with different cores can optionally be consolidated in the electronics 280 illustrated in FIG. 2. The consolidated electronics 280 can be positioned on the LIDAR chip or can be external to the LIDAR chip. The consolidated electronics 280 can collect or generate the LIDAR data results from different cores, and/or can coordinate the LIDAR data results from different cores so as to assemble LIDAR data results for the LIDAR system's field of view.

Although FIG. 2 illustrates four cores on the LIDAR chip, the LIDAR chip can include one, two, or more than two cores. Suitable numbers of cores on the LIDAR chip, include, but are not limited to, numbers greater than or equal to 2, 4, or 6 and/or less than 32, 64, or 128.

Figure 3A:
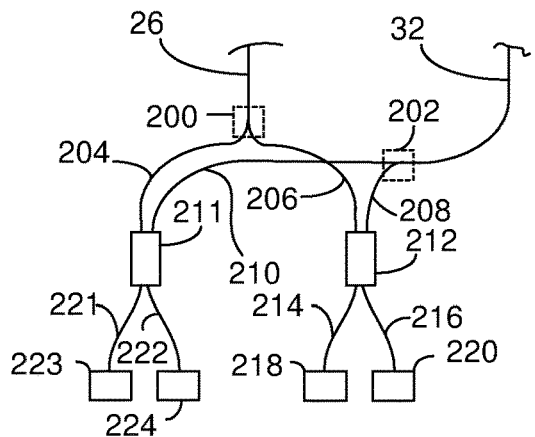
FIG. 3A through FIG. 3B illustrate an example of a processing component that is suitable for use as the processing component in a LIDAR system constructed according to FIG. 1A and FIG. 1B.
Figure 3B:
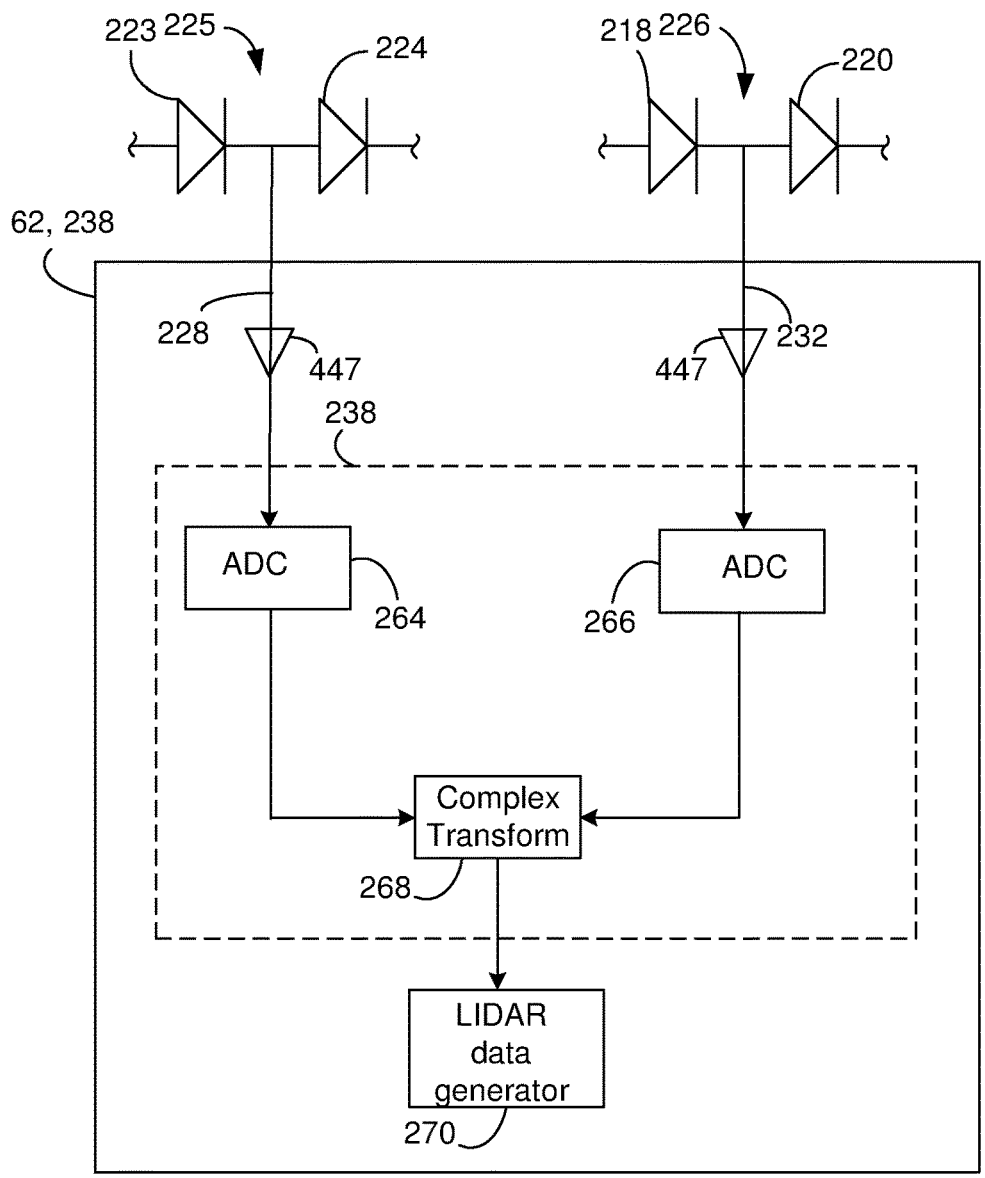

FIG. 3A through FIG. 3B illustrate an example of a processing component that is suitable for use as the processing component 28 in a LIDAR system constructed according to FIG. 1A and FIG. 1B. The processing component includes an optical-to-electrical assembly configured to convert the light signals to electrical signals. FIG. 3A is a schematic of an example of a suitable optical-to-electrical assembly that includes a first splitter 200 that divides the comparative signal received from the comparative waveguide 26 onto a first comparative waveguide 204 and a second comparative waveguide 206. The first comparative waveguide 204 carries a first portion of the comparative signal to a light combiner 211. The second comparative waveguide 206 carries a second portion of the comparative signal to a second light combiner 212.

The processing component of FIG. 2A also includes a second splitter 202 that divides the reference signal received from the reference waveguide 32 onto a first reference waveguide 210 and a second reference waveguide 208. The first reference waveguide 210 carries a first portion of the reference signal to the light combiner 211. The second reference waveguide 208 carries a second portion of the reference signal to the second light combiner 212.

The second light combiner 212 combines the second portion of the comparative signal and the second portion of the reference signal into a second composite signal. Due to the difference in frequencies between the second portion of the comparative signal and the second portion of the reference signal, the second composite signal is beating between the second portion of the comparative signal and the second portion of the reference signal. The first composite signal and the second composite signal are each an example of a composite signal.

The second light combiner 212 also splits the resulting second composite signal onto a first auxiliary detector waveguide 214 and a second auxiliary detector waveguide 216. The first auxiliary detector waveguide 214 carries a first portion of the second composite signal to a first auxiliary light sensor 218 that converts the first portion of the second composite signal to a first auxiliary electrical signal. The second auxiliary detector waveguide 216 carries a second portion of the second composite signal to a second auxiliary light sensor 220 that converts the second portion of the second composite signal to a second auxiliary electrical signal. Examples of suitable light sensors include germanium photodiodes (PDs), and avalanche photodiodes (APDs).

In some instances, the second light combiner 212 splits the second composite signal such that the portion of the comparative signal (i.e. the portion of the second portion of the comparative signal) included in the first portion of the second composite signal is phase shifted by 180° relative to the portion of the comparative signal (i.e. the portion of the second portion of the comparative signal) in the second portion of the second composite signal but the portion of the reference signal (i.e. the portion of the second portion of the reference signal) in the second portion of the second composite signal is not phase shifted relative to the portion of the reference signal (i.e. the portion of the second portion of the reference signal) in the first portion of the second composite signal. Alternately, the second light combiner 212 splits the second composite signal such that the portion of the reference signal (i.e. the portion of the second portion of the reference signal) in the first portion of the second composite signal is phase shifted by 180° relative to the portion of the reference signal (i.e. the portion of the second portion of the reference signal) in the second portion of the second composite signal but the portion of the comparative signal (i.e. the portion of the second portion of the comparative signal) in the first portion of the second composite signal is not phase shifted relative to the portion of the comparative signal (i.e. the portion of the second portion of the comparative signal) in the second portion of the second composite signal. Examples of suitable light sensors include germanium photodiodes (PDs), and avalanche photodiodes (APDs).

The first light combiner 211 combines the first portion of the comparative signal and the first portion of the reference signal into a first composite signal. Due to the difference in frequencies between the first portion of the comparative signal and the first portion of the reference signal, the first composite signal is beating between the first portion of the comparative signal and the first portion of the reference signal.

The light combiner 211 also splits the first composite signal onto a first detector waveguide 221 and a second detector waveguide 222. The first detector waveguide 221 carries a first portion of the first composite signal to a first light sensor 223 that converts the first portion of the second composite signal to a first electrical signal. The second detector waveguide 222 carries a second portion of the second composite signal to a second light sensor 224 that converts the second portion of the second composite signal to a second electrical signal. Examples of suitable light sensors include germanium photodiodes (PDs), and avalanche photodiodes (APDs).

In some instances, the light combiner 211 splits the first composite signal such that the portion of the comparative signal (i.e. the portion of the first portion of the comparative signal) included in the first portion of the composite signal is phase shifted by 180° relative to the portion of the comparative signal (i.e. the portion of the first portion of the comparative signal) in the second portion of the composite signal but the portion of the reference signal (i.e. the portion of the first portion of the reference signal) in the first portion of the composite signal is not phase shifted relative to the portion of the reference signal (i.e. the portion of the first portion of the reference signal) in the second portion of the composite signal. Alternately, the light combiner 211 splits the composite signal such that the portion of the reference signal (i.e. the portion of the first portion of the reference signal) in the first portion of the composite signal is phase shifted by 180° relative to the portion of the reference signal (i.e. the portion of the first portion of the reference signal) in the second portion of the composite signal but the portion of the comparative signal (i.e. the portion of the first portion of the comparative signal) in the first portion of the composite signal is not phase shifted relative to the portion of the comparative signal (i.e. the portion of the first portion of the comparative signal) in the second portion of the composite signal.

When the second light combiner 212 splits the second composite signal such that the portion of the comparative signal in the first portion of the second composite signal is phase shifted by 180° relative to the portion of the comparative signal in the second portion of the second composite signal, the light combiner 211 also splits the composite signal such that the portion of the comparative signal in the first portion of the composite signal is phase shifted by 180° relative to the portion of the comparative signal in the second portion of the composite signal. When the second light combiner 212 splits the second composite signal such that the portion of the reference signal in the first portion of the second composite signal is phase shifted by 180° relative to the portion of the reference signal in the second portion of the second composite signal, the light combiner 211 also splits the composite signal such that the portion of the reference signal in the first portion of the composite signal is phase shifted by 180° relative to the portion of the reference signal in the second portion of the composite signal.

The first reference waveguide 210 and the second reference waveguide 208 are constructed to provide a phase shift between the first portion of the reference signal and the second portion of the reference signal. For instance, the first reference waveguide 210 and the second reference waveguide 208 can be constructed so as to provide a 90 degree phase shift between the first portion of the reference signal and the second portion of the reference signal. As an example, one reference signal portion can be an in-phase component and the other a quadrature component. Accordingly, one of the reference signal portions can be a sinusoidal function and the other reference signal portion can be a cosine function. In one example, the first reference waveguide 210 and the second reference waveguide 208 are constructed such that the first reference signal portion is a cosine function and the second reference signal portion is a sine function. Accordingly, the portion of the reference signal in the second composite signal is phase shifted relative to the portion of the reference signal in the first composite signal, however, the portion of the comparative signal in the first composite signal is not phase shifted relative to the portion of the comparative signal in the second composite signal.

The first light sensor 223 and the second light sensor 224 can be connected as a balanced detector and the first auxiliary light sensor 218 and the second auxiliary light sensor 220 can also be connected as a balanced detector. The balanced detector(s) serve as light sensors that convert a light signal to an electrical signal. FIG. 3B provides a schematic of the relationship between the electronics, the first light sensor 223, the second light sensor 224, the first auxiliary light sensor 218, and the second auxiliary light sensor 220. The symbol for a photodiode is used to represent the first light sensor 223, the second light sensor 224, the first auxiliary light sensor 218, and the second auxiliary light sensor 220 but one or more of these sensors can have other constructions. In some instances, all of the components illustrated in the schematic of FIG. 3B are included on the LIDAR chip. In some instances, the components illustrated in the schematic of FIG. 3B are distributed between the LIDAR chip and electronics located off of the LIDAR chip.

The electronics connect the first light sensor 223 and the second light sensor 224 as a first balanced detector 225 and the first auxiliary light sensor 218 and the second auxiliary light sensor 220 as a second balanced detector 226. In particular, the first light sensor 223 and the second light sensor 224 are connected in series. Additionally, the first auxiliary light sensor 218 and the second auxiliary light sensor 220 are connected in series. The serial connection in the first balanced detector is in communication with a first data line 228 that carries the output from the first balanced detector as a first data signal. The serial connection in the second balanced detector is in communication with a second data line 232 that carries the output from the second balanced detector as a second data signal. The first data line and the second data line are each an example of a data line. The first data signal is an electrical data signal that carries a representation of the first composite signal and the second data signal is an electrical data signal that carries a representation of the second composite signal. Accordingly, the first data signal includes a contribution from a first waveform and a second waveform and the second data signal is a composite of the first waveform and the second waveform. The portion of the first waveform in the first data signal is phase-shifted relative to the portion of the first waveform in the first data signal but the portion of the second waveform in the first data signal being in-phase relative to the portion of the second waveform in the first data signal. For instance, the second data signal includes a portion of the reference signal that is phase shifted relative to a different portion of the reference signal that is included the first data signal. Additionally, the second data signal includes a portion of the comparative signal that is in-phase with a different portion of the comparative signal that is included in the first data signal. The first data signal and the second data signal are beating as a result of the beating between the comparative signal and the reference signal, i.e. the beating in the first composite signal and in the second composite signal.

The electronics 62 includes a transform mechanism 238 configured to perform a mathematical transform on the first data signal and the second data signal. For instance, the mathematical transform can be a complex Fourier transform with the first data signal and the second data signal as inputs. Since the first data signal is an in-phase component and the second data signal its quadrature component, the first data signal and the second data signal together act as a complex data signal where the first data signal is the real component and the second data signal is the imaginary component of the input.

The transform mechanism 238 includes a first Analog-to-Digital Converter (ADC) 264 that receives the first data signal from the first data line 228. The first Analog-to-Digital Converter (ADC) 264 converts the first data signal from an analog form to a digital form and outputs a first digital data signal. The transform mechanism 238 includes a second Analog-to-Digital Converter (ADC) 266 that receives the second data signal from the second data line 232. The second Analog-to-Digital Converter (ADC) 266 converts the second data signal from an analog form to a digital form and outputs a second digital data signal. The first digital data signal is a digital representation of the first data signal and the second digital data signal is a digital representation of the second data signal. Accordingly, the first digital data signal and the second digital data signal act together as a complex signal where the first digital data signal acts as the real component of the complex signal and the second digital data signal acts as the imaginary component of the complex data signal.

The transform mechanism 238 includes a transform component 268 that receives the complex data signal. For instance, the transform component 268 receives the first digital data signal from the first Analog-to-Digital Converter (ADC) 264 as an input and also receives the second digital data signal from the first Analog-to-Digital Converter (ADC) 266 as an input. The transform component 268 can be configured to perform a mathematical transform on the complex signal so as to convert from the time domain to the frequency domain. The mathematical transform can be a complex transform such as a complex Fast Fourier Transform (FFT). A complex transform such as a complex Fast Fourier Transform (FFT) provides an unambiguous solution for the shift in frequency of a comparative signal relative to the system output signal.

The electronics include a LIDAR data generator 270 that receives the output from the transform component 268 and processes the output from the transform component 268 so as to generate the LIDAR data (distance and/or radial velocity between the reflecting object and the LIDAR chip or LIDAR system). The LIDAR data generator performs a peak find on the output of the transform component 268 to identify one or more peaks in the beat frequency.

The electronics use the one or more frequency peaks for further processing to generate the LIDAR data (distance and/or radial velocity between the reflecting object and the LIDAR chip or LIDAR system). The transform component 268 can execute the attributed functions using firmware, hardware or software or a combination thereof.

Figure 3C:
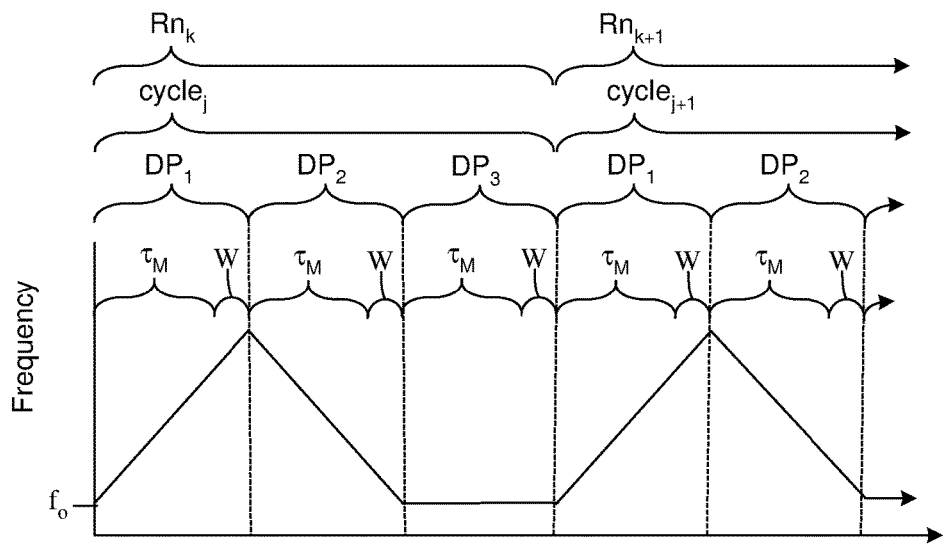
FIG. 3C illustrates the frequency of a signal output from the imaging system over time.

FIG. 3C shows an example of a relationship between the frequency of the system output signal, time, cycles and data periods. The base frequency of the system output signal ($f_o$) can be the frequency of the system output signal at the start of a cycle.

FIG. 3C shows frequency versus time for a sequence of two cycles labeled $cycle_j$ and $cycle_{j+1}$. In some instances, the frequency versus time pattern is repeated in each cycle as shown in FIG. 3C. The illustrated cycles do not include re-location periods and/or re-location periods are not located between cycles. As a result, FIG. 3C illustrates the results for a continuous scan where the steering of the system output signal is continuous.

Each cycle includes K data periods that are each associated with a period index k and are labeled $DP_k$. In the example of FIG. 3C, each cycle includes three data periods labeled $DP_k$ with k=1, 2, and 3. In some instances, the frequency versus time pattern is the same for the data periods that correspond to each other in different cycles as is shown in FIG. 3C. Corresponding data periods are data periods with the same period index. As a result, each data period $DP_1$ can be considered corresponding data periods and the associated frequency versus time patterns are the same in FIG. 3C. At the end of a cycle, the electronics return the frequency to the same frequency level at which it started the previous cycle.

During the data period $DP_1$, and the data period $DP_2$, the electronics operate the light source such that the frequency of the system output signal changes at a linear rate $\alpha$. The direction of the frequency change during the data period $DP_1$ is the opposite of the direction of the frequency change during the data period $DP_2$.

FIG. 3C labels sample regions that are each associated with a sample region index k and are labeled $Rn_k$. FIG. 3C labels sample regions $Rn_k$ and $Rn_{k+1}$. Each sample region is illuminated with the system output signal during the data periods that FIG. 3C shows as associated with the sample region. For instance, sample region $Rn_k$ is illuminated with the system output signal during the data periods labeled $DP_1$ through $DP_3$. The sample region indices k can be assigned relative to time. For instance, the sample regions can be illuminated by the system output signal in the sequence indicated by the index k. As a result, the sample region $Rn_{10}$ can be illuminated after sample region $Rn_9$ and before $Rn_{11}$.

The LIDAR system is typically configured to provide reliable LIDAR data when the object is within an operational distance range from the LIDAR system. The operational distance range can extend from a minimum operational distance to a maximum operational distance. A maximum roundtrip time can be the time required for a system output signal to exit the LIDAR system, travel the maximum operational distance to the object, and to return to the LIDAR system and is labeled $\tau_M$ in FIG. 3C.

Since there is a delay between the system output signal being transmitted and returning to the LIDAR system, the composite signals do not include a contribution from the LIDAR signal until after the system return signal has returned to the LIDAR system. Since the composite signal needs the contribution from the system return signal for there to be a LIDAR beat frequency, the electronics measure the LIDAR beat frequency that results from system return signal that return to the LIDAR system during a data window in the data period. The data window is labeled "W" in FIG. 3C. The contribution from the LIDAR signal to the composite signals will be present at times larger than the maximum operational time delay ($\tau_M$). As a result, the data window is shown extending from the maximum operational time delay ($\tau_M$) to the end of the data period.

A frequency peak in the output from the Complex Fourier transform represents the beat frequency of the composite signals that each includes a comparative signal beating against a reference signal. The beat frequencies from two or more different data periods can be combined to generate the LIDAR data. For instance, the beat frequency determined from $DP_1$ in FIG. 3C can be combined with the beat frequency determined from $DP_2$ in FIG. 3C to determine the LIDAR data. As an example, the following equation applies during a data period where electronics increase the frequency of the outgoing LIDAR signal during the data period such as occurs in data period $DP_1$ of FIG. 3C: $f_{ub} = -f_d + \alpha \tau$ where $f_{ub}$ is the frequency provided by the transform component, $f_d$ represents the Doppler shift ($f_d = 2vf_c/c$) where $f_c$ represents the optical frequency ($f_o$), c represents the speed of light, v is the radial velocity between the reflecting object and the LIDAR system where the direction from the reflecting object toward the chip is assumed to be the positive direction, t is the time in which the light from the system output signal travels to the object and returns to the LIDAR system (the roundtrip time), and c is the speed of light. The following equation applies during a data period where electronics decrease the frequency of the outgoing LIDAR signal such as occurs in data period $DP_2$ of FIG. 3C: $f_{db}=-f_d-\alpha\tau$ where $f_{db}$ is a frequency provided by the transform component ($f_{i,\,LDP}$ determined from $DP_2$ in this case). In these two equations, $f_d$ and $\tau$ are unknowns. The electronics solve these two equations for the two unknowns. The radial velocity for the sample region then be calculated from the Doppler shift ($v=c*f_d/(2f_c)$) and/or the separation distance for that sample region can be calculated from $c*\tau/2$. As a result, the electronics use each of the beat frequencies can as a variable in one or more equations that yield the LIDAR data. Since the LIDAR data can be generated for each corresponding frequency pair output by the transform, separate LIDAR data can be generated for each of the objects in a sample region. Accordingly, the electronics can determine more than one radial velocity and/or more than one radial separation distance from a single sampling of a single sample region in the field of view.

The data period labeled $DP_3$ in FIG. 3C is optional. As noted above, there are situations where more than one object is present in a sample region. For instance, during the feedback period in $DP_1$ for $cycle_2$ and also during the feedback period in $DP_2$ for $cycle_2$, more than one frequency pair can be matched. In these circumstances, it may not be clear which frequency peaks from $DP_2$ correspond to which frequency peaks from $DP_1$. As a result, it may be unclear which frequencies need to be used together to generate the LIDAR data for an object in the sample region. As a result, there can be a need to identify corresponding frequencies. The identification of corresponding frequencies can be performed such that the corresponding frequencies are frequencies from the same reflecting object within a sample region. The data period labeled $DP_3$ can be used to find the corresponding frequencies. LIDAR data can be generated for each pair of corresponding frequencies and is considered and/or processed as the LIDAR data for the different reflecting objects in the sample region.

An example of the identification of corresponding frequencies uses a LIDAR system where the cycles include three data periods ($DP_1$, $DP_2$, and $DP_3$) as shown in FIG. 3C. When there are two objects in a sample region illuminated by the LIDAR outputs signal, the transform component outputs two different frequencies for $f_{ub}$: $f_{u1}$ and $f_{u2}$ during $DP_1$ and another two different frequencies for $f_{db}$: $f_{d1}$ and $f_{d2}$ during $DP_2$. In this instance, the possible frequency pairings are: $(f_{d1}, f_{u1})$; $(f_{d1}, f_{u2})$; $(f_{d2}, f_{u1})$; and $(f_{d2}, f_{du2})$. A value of $f_d$ and $\tau$ can be calculated for each of the possible frequency pairings. Each pair of values for $f_d$ and $\tau$ can be substituted into $f_3=-f_d+\alpha_3\tau_0$ to generate a theoretical $f_3$ for each of the possible frequency pairings. The value of $\alpha_3$ is different from the value of a used in $DP_1$ and $DP_2$. In FIG. 3C, the value of $\alpha_3$ is zero. In this case, the transform component also outputs two values for $f_3$ that are each associated with one of the objects in the sample region. The frequency pair with a theoretical $f_3$ value closest to each of the actual $f_3$ values is considered a corresponding pair. LIDAR data can be generated for each of the corresponding pairs as described above and is considered and/or processed as the LIDAR data for a different one of the reflecting objects in the sample region. Each set of corresponding frequencies can be used in the above equations to generate LIDAR data. The generated LIDAR data will be for one of the objects in the sample region. As a result, multiple different LIDAR data values can be generated for a sample region where each of the different LIDAR data values corresponds to a different one of the objects in the sample region The processing component in FIG. 1A receives a series of comparative signals that carry different channels and are accordingly from different sample regions. As a result, the processing components in FIG. 1A provide LIDAR data for series of sample regions that were illuminated by system output signals carrying different channels. The series of sample regions for which the processing component provides LIDAR data can be the same as the series of sample regions that were illuminated. The processing component configuration of FIG. 3A through FIG. 3C can also be used for the processing components of FIG. 1B. However, the processing components 28 of FIG. 1B receive comparative signals that carry only one of the channels. As a result, when the processing components 28 in FIG. 1B are constructed according to FIG. 3A through FIG. 3C, each of the processing components provides LIDAR data for a series of sample regions that were illuminated by the system output signal carrying only one of the channels.

Figure 3D:
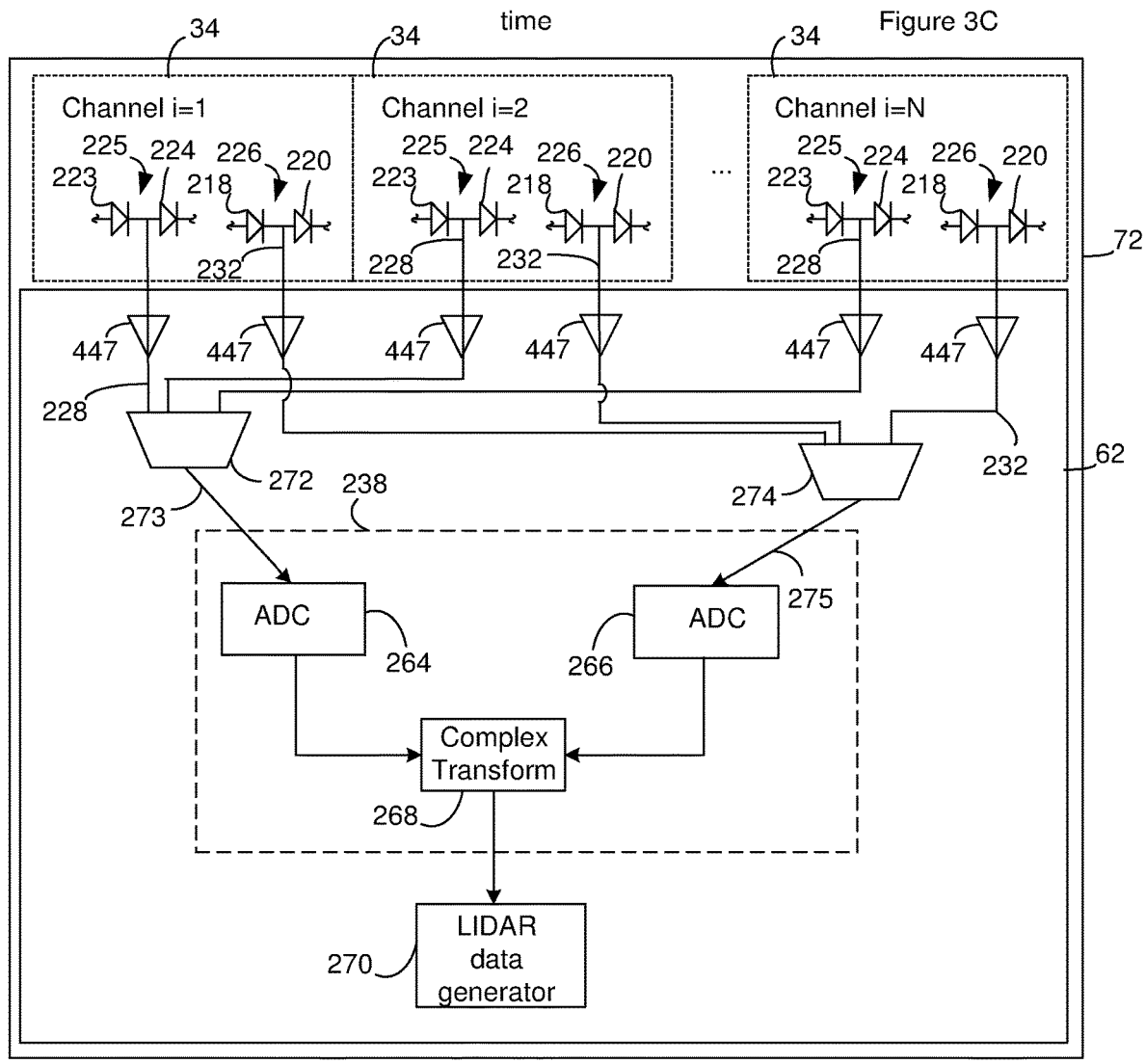
FIG. 3D provides a schematic of the relationship between electronics and the optical-to-electrical assembly of FIG. 3A.

In the LIDAR system of FIG. 1C, the electronics from different processing components 28 can be combined so that beating signals are combined electronically rather than optically. For instance, each of the processing components 28 in a LIDAR system according to FIG. 1C can include the optical-to-electrical assembly of FIG. 3A. FIG. 3D is a schematic of the relationship between the first light sensor 223, the second light sensor 224, the first auxiliary light sensor 218, and the second auxiliary light sensor 220 in each of the optical-to-electrical assemblies from FIG. 3A and the electronics. Since each of the different processing components 28 receives a LIDAR input signal carrying a different channel, FIG. 3D illustrates the first light sensor 223, the second light sensor 224, the first auxiliary light sensor 218, and the second auxiliary light sensor 220 associated with the channel received by the light sensor.

In FIG. 3D, the electronics from different processing components 28 (FIG. 1C) are combined so as to form the common processing component 72. The first data line 228 from each of the different first balanced detectors 225 carries the first data signal to a first electrical multiplexer 272. The first electrical multiplexer 272 outputs the first data signals from different first data lines 228 on a common data line 273. Since system output signals that are from the same core and that carry different channels are serially output from the LIDAR system, the processing component 28 (FIG. 1C) configured to receive the first comparative signal carrying channel i receives the first comparative signal in response to the signal directing component 14 on the core being operated such that the system output signal carrying channel i is output from the LIDAR system. Additionally, processing component(s) 28 that are not configured to receive the comparative signal carrying channel i do not substantially receive a first comparative signal in response to the signal directing component 14 being operated such that the system output signal carrying channel i is output from the LIDAR system. Since the system output signals that carry different channels from the same core are serially output from the LIDAR system, the comparative signals carrying different channels are serially received at different processing component(s) 28 although there may be some overlap of different channels that occurs. Since different processing component(s) 28 serially receive the comparative signals carrying different channels, the first common data line 273 carries first data signals that carry different channels in series. Accordingly, the first common data line 273 carries electrical data signals that are each an electrical representation of the first composite signals and that each carries a different one of the channels in series. There may be some short term overlap between channels in the series of first data signals, however, the overlap does not occur in the data windows illustrated in FIG. 3C. The first common data line 273 carries the series of first data signals to the first Analog-to-Digital Converter (ADC) 264.

The second data lines 232 from each of the different second balanced detectors 226 carries the second data signal to a second electrical multiplexer 274. The second electrical multiplexer 274 outputs the second data signals from different second data line 232 on a second common data line 275. The first common data line and the second common data line are each an example of a common data line. As noted above, the processing component(s) 28 serially receive the first comparative signals carrying different channels. As a result, the second common data line 275 carries second data signals that carry different channels in series. Accordingly, the second common data line 275 carries electrical data signals that are each an electrical representation of the second composite signals and that each carries a different one of the channels in series. There may be some short term overlap between channels in the series of second data signals, however, the overlap does not occur during the data windows illustrated in FIG. 3C. The second common data line 275 carries the series of second data signals to the second Analog-to-Digital Converter (ADC) 266.

The transform mechanism 238 and LIDAR data generator 270 of FIG. 3D can be operated as disclosed in the context of FIG. 3A through FIG. 3C. For instance, the first Analog-to-Digital Converter (ADC) 264 converts the first data signal from an analog form to a digital form and outputs the first digital data signal. The second Analog-to-Digital Converter (ADC) 266 converts the second data signal from an analog form to a digital form and outputs a second digital data signal.

A first digital data signal and the second digital data signal carrying the same channel act together as a complex signal where the first digital data signal acts as the real component of the complex signal and the second digital data signal acts as the imaginary component of the complex data signal. The electronics are configured such that the first digital data signals and the second digital data signals carrying the same channel are concurrently received by the LIDAR data generator 270. As a result, the LIDAR data generator 270 receives a complex signals that carries different channels in series. The LIDAR data generator 270 can generate LIDAR data for each of the different channels. As a result, the data generator 270 can generate LIDAR data for each sample region that is illuminated by the system output signals carrying the series of channels.

In another embodiment of a LIDAR system where the relationship between sensors in the optical-to-electrical assembly from FIG. 3A and electronics in the LIDAR system is constructed according to FIG. 3D, the electronics operate the electrical multiplexers as a switch that can be operated by the electronics. As a result, the electronics can operate the first electrical multiplexer 272 so as select which of the first data signals are output on the common data line 273 and can operate the second electrical multiplexer 274 so as select which of the second data signals are output on the second common data line 275. As a result, the LIDAR system can be configured to concurrently output the system output signals that carry different channels. For instance, the LIDAR chip can be configured to concurrently output each of the LIDAR output signals carrying the different channels. As, the signal directing component 14 can be configured to direct the outgoing LIDAR system to one or more than one of the alternate waveguides 16. In an example where the signal directing component 14 is configured to direct the outgoing LIDAR system all N of the alternate waveguides 16, the signal directing component can be a signal splitter.

When the LIDAR system concurrently outputs system output signals that carry different channels, each of the different processing components 28 can concurrently receive a first LIDAR input signal carrying one of the channels. Accordingly, the first data lines 228 from each of the different processing components 28 concurrently carries the first data signal to the first electrical multiplexer 272. As a result, the first electrical multiplexer 272 concurrently receives multiple first data signals that each carries a different channel and is from a different processing component 28. The electronics use the switching functionality of the first electrical multiplexer 272 to operate the first electrical multiplexer 272 such that the first electrical multiplexer 272 outputs the first data signals carrying different channels in series. As a result, the first common data line 273 carries first data signals that carry different channels in series. An example of a suitable channel series, includes, but is not limited to, the sequence of channels having channel index i=1 through N from i=1 in the numerical sequence from i=1 through to i=N.

The second data lines 232 from each of the different processing components 28 concurrently carries a second data signal to the second electrical multiplexer 274. As a result, the second electrical multiplexer 274 concurrently receives multiple second data signals that each carries a different channel and is from a different processing component 28. The electronics use the switching functionality of the second electrical multiplexer 274 to operate the second electrical multiplexer 274 such that the second electrical multiplexer 274 outputs the second data signals carrying different channels in series. As a result, the second data line 275 carries second data signals that carry different channels in series.

The transform mechanism 238 and LIDAR data generator 270 of FIG. 3D can be operated as disclosed in the context of FIG. 3A through FIG. 3C. For instance, the first Analog-to-Digital Converter (ADC) 264 converts the first data signal from an analog form to a digital form and outputs the first digital data signal. The second Analog-to-Digital Converter (ADC) 266 converts the second data signal from an analog form to a digital form and outputs a second digital data signal.

The first electrical multiplexer 272 and the second electrical multiplexer 274 are operated such that the first data line 273 and the second data line 275 concurrently carry the same channel. As a result, the first digital data signal and the second digital data signal output from the first Analog-to-Digital Converter (ADC) 264 and the second Analog-to-Digital Converter (ADC) 266 concurrently carry the same channel. The first digital data signal and the second digital data signal carrying the same channel act together as a complex signal where the first digital data signal acts as the real component of the complex signal and the second digital data signal acts as the imaginary component of the complex data signal. The first digital data signals and the second digital data signals carrying the same channel are concurrently received by the LIDAR data generator 270. As a result, the LIDAR data generator 270 receives a complex signals that carries different channels in series. The LIDAR data generator 270 can generate LIDAR data for each of the channel in the series of channels. As a result, the data generator 270 can generate LIDAR data for each sample region that is illuminated by the system output signals carrying the series of channels.

Figure 3E:
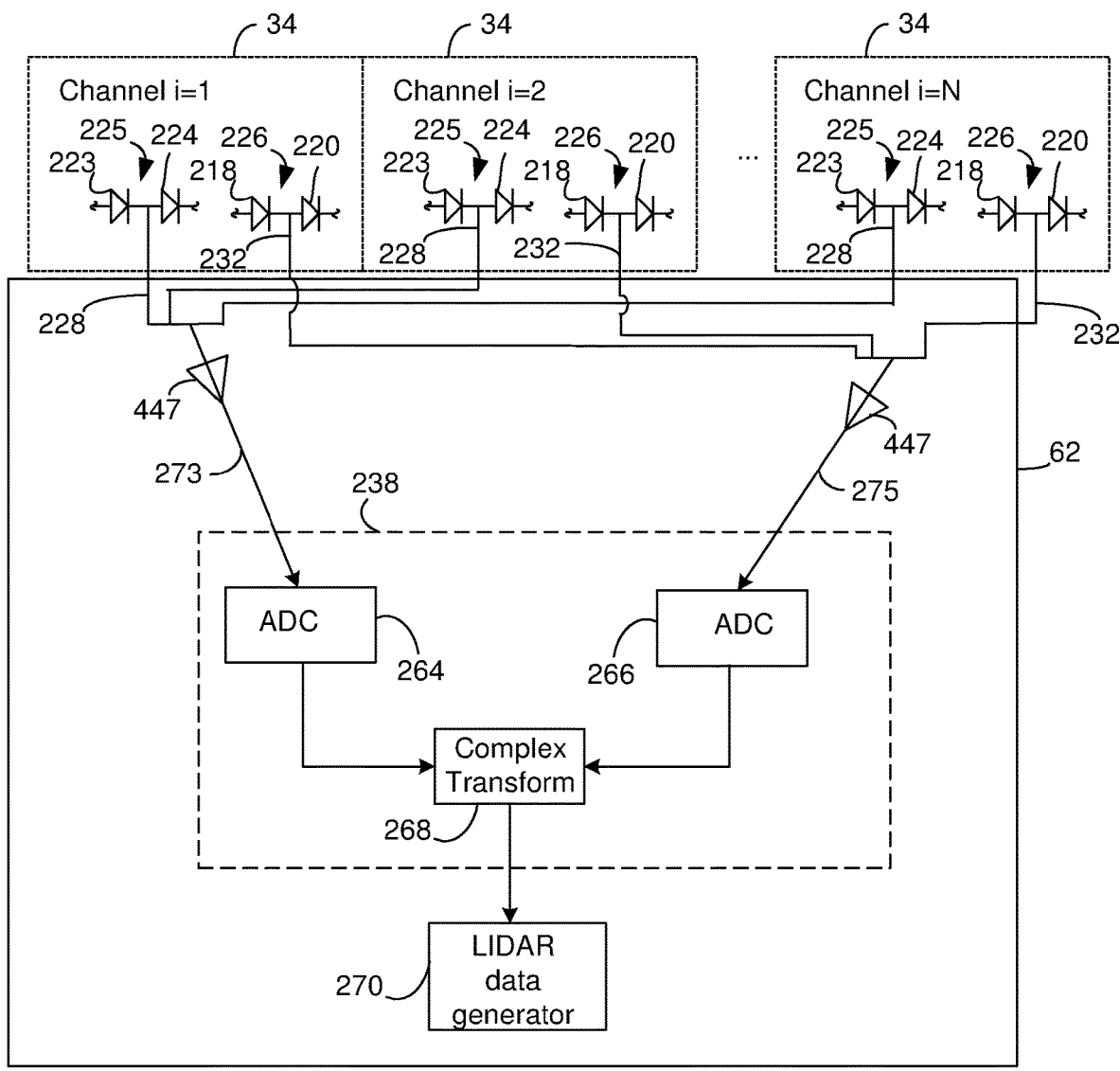
FIG. 3E is a schematic of another relationship between sensors in the optical-to-electrical assembly from FIG. 3A and electronics in the LIDAR system.

An alternative to the first electrical multiplexer 272 and/or the second electrical multiplexer 274 is to provide an electrical node where the first data lines 228 from each of the different first balanced detectors 225 are in electrical communication with one another and a second electrical node the second data lines 232 from each of the different second balanced detectors 226 are in electrical communication with one another. As a result, the outputs of the light sensors such as the first balanced detectors 225 are effectively electrically connected to one another and the outputs of light sensors such as the second balanced detectors 226 are effectively electrically connected to one another. As an example, FIG. 3E illustrates the arrangement of FIG. 3D modified such that the first data lines 228 from each of the different first balanced detectors 225 are in electrical communication with the first common data line 273. Since the LIDAR system outputs system output signals that carry different channels in series, the first common data line 273 carries first data signals that carry different channels in series. While there may be some overlap between channels that are adjacent to one another in the series, the overlap does not occur during the data window. Additionally, the second data lines 232 from each of the different second balanced detectors 226 are in electrical communication with the second common data line 275. Since the LIDAR system outputs system output signals that carry different channels in series, the second common data line 275 carries second data signals that carry different channels in series. While there may be some overlap between channels that are adjacent to one another in the series, the overlap does not occur during the data window. Since the first common data line 273 carries first data signals that carry different channels in series and the second common data line 275 carries second data signals that carry different channels in series as also occurs in the LIDAR system of FIG. 6D, the transform mechanism 238 and LIDAR data generator 270 can be operated as disclosed in the context of FIG. 3E to generate LIDAR data for each sample region that is illuminated by the system output signals carrying the series of channels.

In a LIDAR system constructed according to FIG. 3E, during a cycle when the LIDAR system is outputting a system output signal that carries channel i, the optical-to-electrical assembly included in the processing component configured to receive the current channel i (the active processing component) receives the first LIDAR input signals that carries channel i during at least the data window while the processing component that are not configured to receive the current channel i (the inactive processing component(s)) do not receive a first LIDAR input signal. However, the inactive processing component(s) continue to receive a reference signal during at least the data window. Light from the reference signal(s) received by the inactive processing component(s) can pass through the optical-to-electrical assemblies and become noise in electrical signals such as the first data signals and the second data signals.

In some instances, it may be desirable to fully or partially attenuate all or a portion of the reference signal(s) received by the inactive processing component(s). For instance, the reference waveguides 32 (FIG. 1C) can each optionally include an optical attenuator 276. The attenuators 276 can be operated by the electronics so as to fully or partially attenuate the reference signal guided by the reference waveguide 32 along which the attenuator 276 is positioned.

The processing component labeled 28 in FIG. 1C that serves as the active processing component and the processing component(s) labeled 28 in FIG. 1C that serve as the inactive processing component(s) changes as the channel carried by the system output signal changes. As a result, the electronics can change the reference signal(s) that are attenuated in response to changes in the channel that is currently being carried in the system output signal. For instance, the electronics can operate the attenuators 276 such that the reference signal to be received by an active processing component is not attenuated or is not substantially attenuated. Additionally, the electronics can operate the attenuators 276 such that the reference signal(s) to be received by all or a portion of the inactive processing component(s) is fully or partially attenuated. Since the reference signal(s) to be received by all or a portion of the inactive processing component(s) is fully or partially attenuated, the amount of light from the reference signals that is actually received by the inactive processing component(s) is reduced. As a result, the attenuated light is not a source of noise in the first data signal and the second data signal.

Although the optical attenuators 276 are shown positioned on the reference waveguides 32 of FIG. 1C, the optical attenuators 276 can be positioned on all or a portion of the reference waveguides 32 illustrated in the imaging systems of FIG. 1A and FIG. 1B. The electronics can operate the variable optical attenuators 276 so as to achieve the desired level of attenuation of the power of the reference signal.

Suitable devices suitable for use as an optical attenuator 276 include, but are not limited to, variable optical attenuators (VOAs), PIN diodes, and Mach-Zehnder modulators. An example of a suitable optical attenuator can be found in U.S. patent application Ser. No. 17/396,616, filed on Aug. 6, 2021, entitled "Carrier Injector Having Increased Compatibility," and incorporated herein in its entirety.

Figure 4:
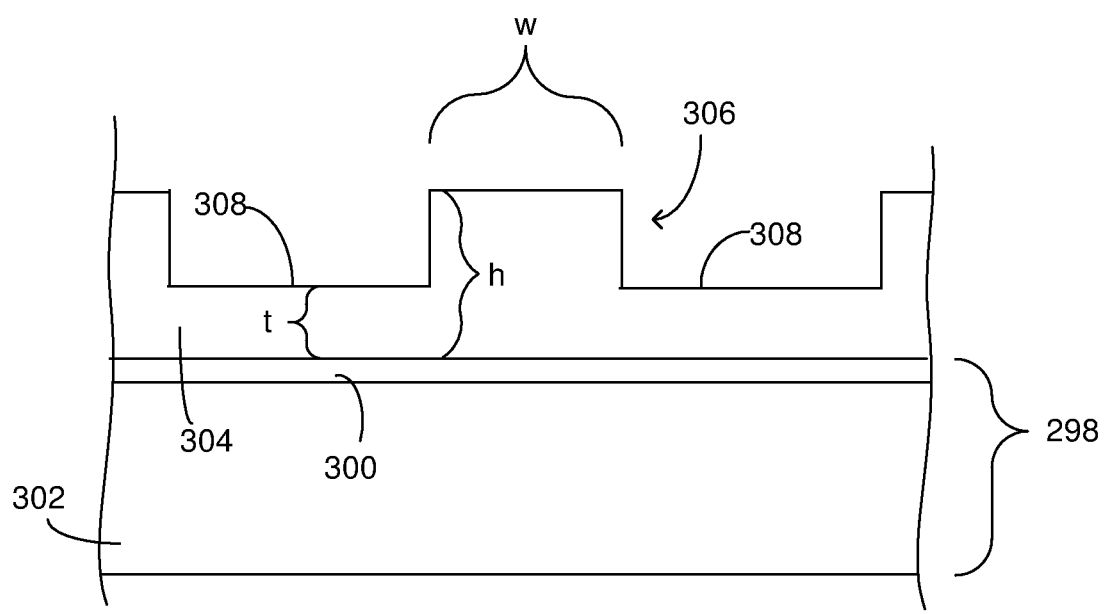
FIG. 4 is a cross section of a silicon-on-insulator wafer.

Suitable platforms for the LIDAR chip include, but are not limited to, silica, indium phosphide, and silicon-on-insulator wafers. FIG. 4 is a cross section of a silicon-on-insulator wafer. A silicon-on-insulator (SOI) wafer includes a buried layer 300 between a substrate 302 and a light-transmitting medium 304. In a silicon-on-insulator wafer, the buried layer 300 is silica while the substrate 302 and the light-transmitting medium 304 are silicon. The substrate of an optical platform such as an SOI wafer can serve as the base for a LIDAR chip. For instance, in some instances, the optical components shown in FIG. 1A through FIG. 1C can be positioned on or over the top and/or lateral sides of the same substrate. As a result, the substrate of an optical platform such as an SOI wafer can serve as base 298 shown in FIG. 2B.

The portion of the LIDAR chip illustrated in FIG. 4 includes a waveguide construction that is suitable for use with chips constructed from silicon-on-insulator wafers. A ridge 306 of the light-transmitting medium 304 extends away from slab regions 308 of the light-transmitting medium 304. The light signals are constrained between the top of the ridge and the buried layer 300. As a result, the ridge 306 at least partially defines the waveguide.

The dimensions of the ridge waveguide are labeled in FIG. 4. For instance, the ridge has a width labeled w and a height labeled h. A thickness of the slab regions is labeled t. For LIDAR applications, these dimensions can be more important than other applications because of the need to use higher levels of optical power than are used in other applications. The ridge width (labeled w) is greater than 1 µm and less than 4 µm, the ridge height (labeled h) is greater than 1 µm and less than 4 µm, the slab region thickness is greater than 0.5 µm and less than 3 µm. These dimensions can apply to straight or substantially straight portions of the waveguide, curved portions of the waveguide and tapered portions of the waveguide(s). Accordingly, these portions of the waveguide will be single mode. However, in some instances, these dimensions apply to straight or substantially straight portions of a waveguide. Additionally or alternately, curved portions of a waveguide can have a reduced slab thickness in order to reduce optical loss in the curved portions of the waveguide. For instance, a curved portion of a waveguide can have a ridge that extends away from a slab region with a thickness greater than or equal to 0.0 µm and less than 0.5 µm. While the above dimensions will generally provide the straight or substantially straight portions of a waveguide with a single-mode construction, they can result in the tapered section(s) and/or curved section(s) that are multi-mode. Coupling between the multi-mode geometry to the single mode geometry can be done using tapers that do not substantially excite the higher order modes. Accordingly, the waveguides can be constructed such that the signals carried in the waveguides are carried in a single mode even when carried in waveguide sections having multi-mode dimensions. The waveguide construction of FIG. 4 is suitable for all or a portion of the waveguides on a LIDAR chip constructed according to FIG. 1A through FIG. 1C.

Figure 5A:
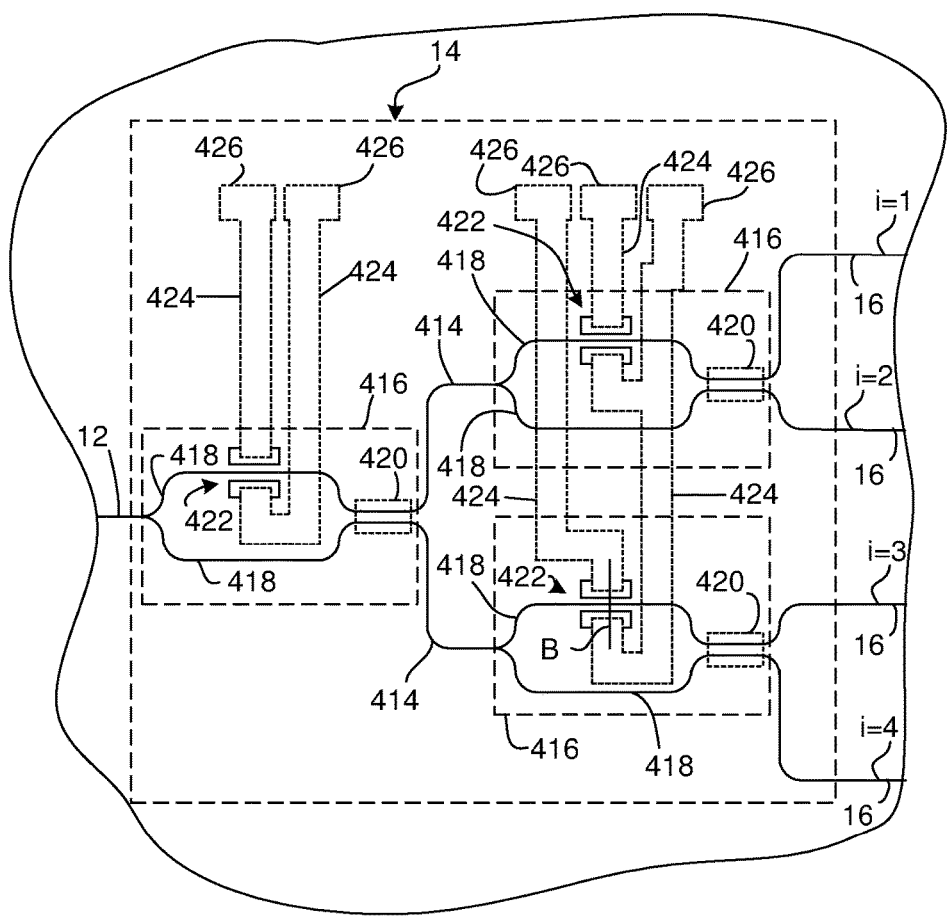
FIG. 5A and FIG. 5B illustrate an example of an optical switch that includes cascaded Mach-Zehnder interferometers.
Figure 5B:
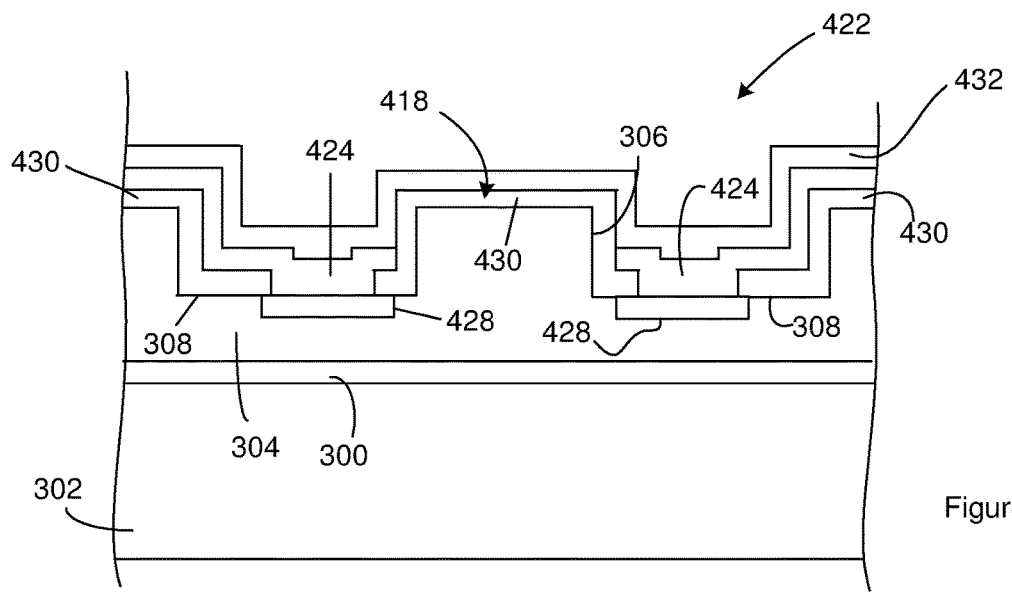

Suitable signal directing components 14 for use with the LIDAR chip include, but are not limited to, optical switches such as cascaded Mach-Zehnder interferometers and micro-ring resonator switches. In one example, the signal directing component 14 includes cascaded Mach-Zehnder interferometers that use thermal or free-carrier injection phase shifters. FIG. 5A and FIG. 5B illustrate an example of an optical switch that includes cascaded Mach-Zehnder interferometers 416. FIG. 5A is a topview of the optical switch. FIG. 5B is a cross section of the optical switch shown in FIG. 5A taken along the line labeled B in FIG. 5A.

The optical switch receives the outgoing LIDAR signal from the utility waveguide 12. The optical switch is configured to direct the outgoing LIDAR signal to one of several alternate waveguides 16. The optical switch includes interconnect waveguides 414 that connect multiple Mach-Zehnder interferometers 416 in a cascading arrangement. Each of the Mach-Zehnder interferometers 416 directs the outgoing LIDAR signal to one of two interconnect waveguides 414. The electronics can operate each Mach-Zehnder so as to select which of the two interconnect waveguides 414 receives the outgoing LIDAR signal from the Mach-Zehnder interferometer 416. The interconnect waveguides 414 that receive the outgoing LIDAR signal can be selected such that the outgoing LIDAR signal is guided through the optical switch to a particular one of the alternate waveguides 16.

Each of the Mach-Zehnder interferometers 416 includes two branch waveguides 418 that each receives a portion of the outgoing LIDAR signal from the utility waveguide 12 or from an interconnect waveguide 414. Each of the Mach-Zehnder interferometers 416 includes a direction component 420 that receives two portions of the outgoing LIDAR signal from the branch waveguides 418. The direction component 420 steers the outgoing LIDAR signal to one of the two interconnect waveguides 414 configured to receive the outgoing LIDAR signal from the direction component 420. The interconnect waveguide 414 to which the outgoing LIDAR signal is directed is a function of the phase differential between the two different portions of the outgoing LIDAR signal received by the direction component 420. Although FIG. 5A illustrates a directional coupler operating as the direction component 420, other direction components 420 can be used. Suitable alternate direction components 420 include, but are not limited to, Multi-Mode Interference (MMI) devices and tapered couplers.

Each of the Mach-Zehnder interferometers 416 includes a phase shifter 422 positioned along one of the branch waveguides 418. The output component includes conductors 424 in electrical communication with the phase shifters 422. The conductors 424 are illustrated as dashed lines so they can be easily distinguished from underlying features. The conductors 424 each terminate at a contact pad 426. The contact pads 426 can be used to provide electrical communication between the conductors 424 and the electronics. Accordingly, the conductors 424 provide electrical communication between the electronics and the phase shifters 422 and allow the electronics to operate the phase shifters 422. Suitable conductors 424 include, but are not limited to, metal traces. Suitable materials for the conductors include, but are not limited to, titanium, aluminum and gold.

The electronics can operate each of the phase shifters 422 so as to control the phase differential between the portions of the outgoing LIDAR signal received by a direction component 420. In one example, a phase shifter 422 can be operated so as to change the index of refraction of a portion of at least a portion of a branch waveguide 418. Changing the index of a portion of a branch waveguide 418 in a Mach-Zehnder interferometer 416, changes the effective length of that branch waveguides 418 and accordingly changes the phase differential between the portions of the outgoing LIDAR signal received by a direction component 420. The ability of the electronics to change the phase differential allows the electronics to select the interconnect waveguide 414 that receives the outgoing LIDAR signal from the direction component 420.

FIG. 5B illustrates one example of a suitable construction of a phase shifter 422 on a branch waveguide 418. The branch waveguide 418 is at least partially defined by a ridge 306 of the light-transmitting medium 304 that extends away from slab regions 308 of the light-transmitting medium 304. Doped regions 428 extend into the slab regions 308 with one of the doped regions including an n-type dopant and one of the doped regions 428 including a p-type dopant. A first cladding 430 is positioned between the light-transmitting medium 304 and a conductor 424. The conductors 424 each extend through an opening in the first cladding 430 into contact with one of the doped regions 428. A second cladding 432 is optionally positioned over the first cladding 430 and over the conductor 424. The electronics can apply a forward bias can be applied to the conductors 424 so as to generate an electrical current through the branch waveguide 418. The resulting injection of carriers into the branch waveguide 418 causes free carrier absorption that changes the index of refraction in the branch waveguide 418.

The first cladding 430 and/or the second cladding 432 illustrated in FIG. 5B can each represent one or more layers of materials. The materials for the first cladding 430 and/or the second cladding 432 can be selected to provide electrical isolation of the conductors 424, lower index of refraction relative to the light-transmitting medium 304, stress reduction and mechanical and environmental protection. Suitable materials for the first cladding 430 and/or the second cladding 432 include, but are not limited to, silicon nitride, tetraorthosilicate (TEOS), silicon dioxide, silicon nitride, and aluminum oxide. The one or more materials for the first cladding 430 and/or the second cladding 432 can be doped or undoped.

Figure 6:
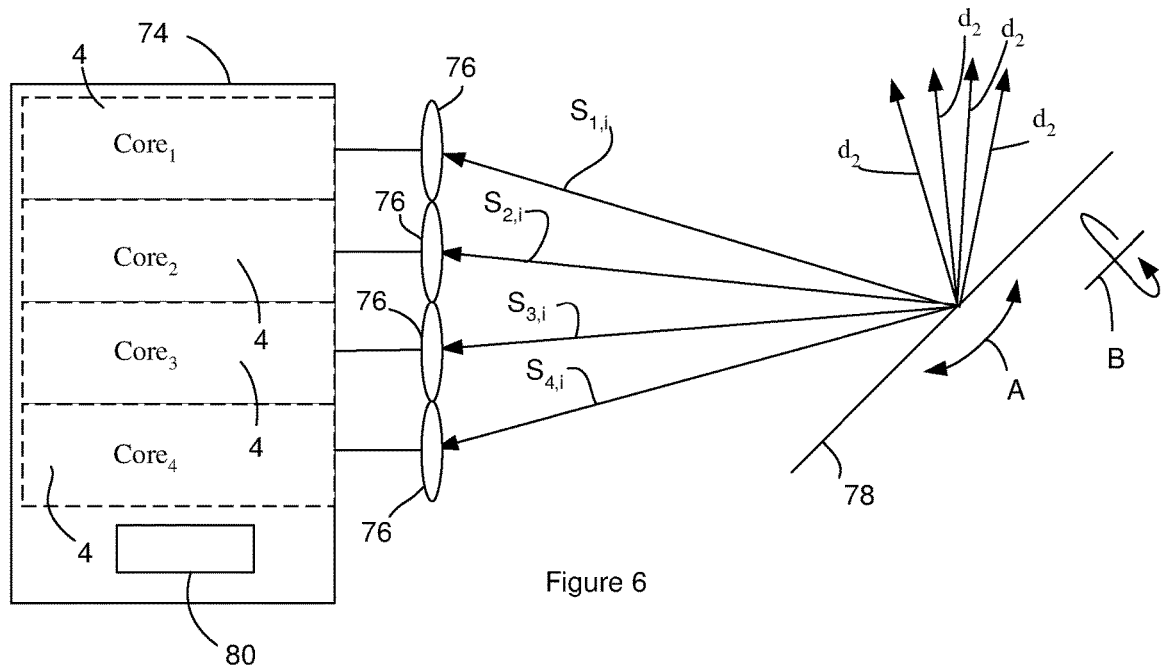
FIG. 6 illustrates the LIDAR system of FIG. 2 modified to have multiple signal directors that each receives LIDAR output signals from a different core.

In instances where the LIDAR system includes multiple cores, the LIDAR system can include multiple signal directors 76 and different signal directors 76 can receive LIDAR output signals from different selections of the signal directors 76. As an example, FIG. 6 illustrates the LIDAR system of FIG. 2 modified to have multiple signal directors 76 that each receives LIDAR output signals from a different one of the cores.

Figure 7:
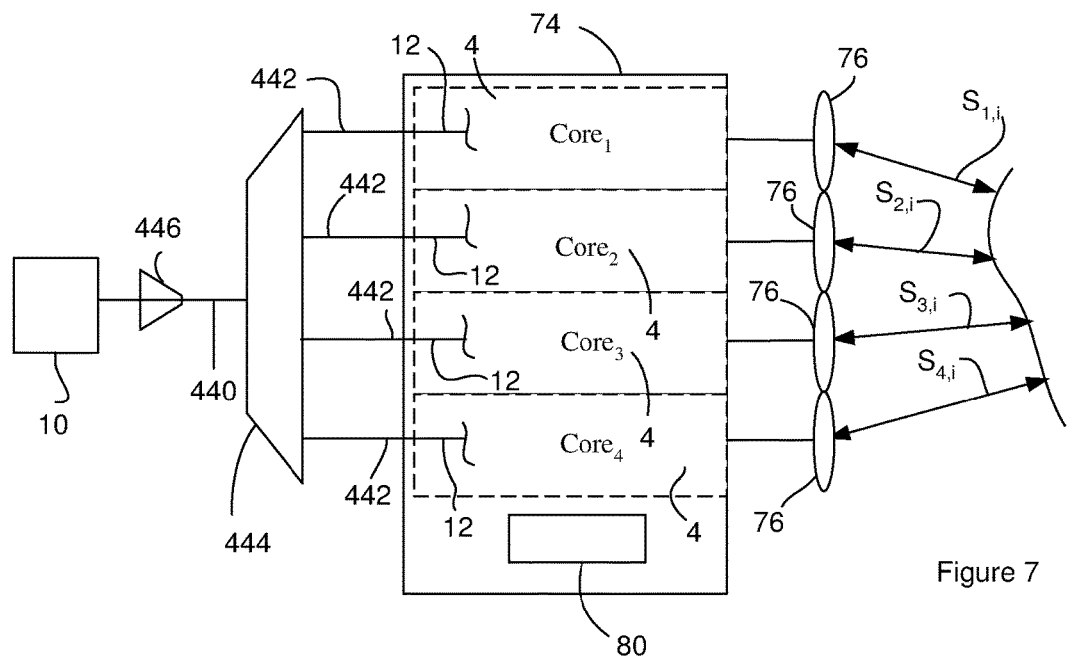
FIG. 7 illustrates the LIDAR system of FIG. 2 where a light source is located external to the chip.

FIG. 1A through FIG. 1C illustrate each of the cores including a different light source 10. However, the multiple cores, all of the cores, or a portion of the cores can receive the outgoing LIDAR signal from a common light source. In some instances, the cores are arranged in groups where each core in a group receives the outgoing LIDAR signal from the same common light source and the cores in different groups receives the outgoing LIDAR signal from the different common light sources. In some instances, a group of cores can include a single one of the cores. As an example, FIG. 7 illustrates the LIDAR system of FIG. 2 where a light source 10 is located external to the cores and each of the cores receives an outgoing LIDAR signal from the light source.

A first optical link 440 provide optical communication between the light source 10 and a signal splitter 442. Second optical links 444 provide optical communication between the signal splitter 442 and the utility waveguides 12 on different cores 4. The light source 10 outputs a preliminary signal that is received on the first optical link 440. The signal splitter 442 receives the preliminary signal from the first optical link 440. The signal splitter 442 splits the preliminary signal into a split signals that are each received on a different one of the second optical links 444. Each of the utility waveguides 12 receive a split signal from a different one of the optical links 444. The portion of a split signal that enters a utility waveguide serves as the outgoing LIDAR signal.

The LIDAR system can optionally include an amplifier 446 positioned along the first optical link 440 so as to amplify the power of the preliminary signal. Suitable amplifiers 446 for use along an optical link, include, but are not limited to, SOAs, Erbium Doped Fiber Amplifiers (EDFAs), and Preasodymium Doped Fiber Amplifiers (PDFAs).

When it is desirable for the different outgoing LIDAR signals to have the same or substantially the same distribution of wavelengths, suitable signal splitters 442 include, but are not limited to, wavelength independent signal combiners such as an optical couplers, y-junctions, MMIs, cascaded evanescent optical couplers, and cascaded y-junctions. When it is desirable for the different outgoing LIDAR signals to have different wavelength distributions, suitable signal splitters 442 include, but are not limited to, wavelength dependent signal splitters 442 including optical demultiplexers such as Arrayed Waveguide Gratings (AWGs), and echelle gratings.

In some instances where multiple different cores receive an outgoing LIDAR signal from a common light source, only one of the cores that receives its outgoing LIDAR signal from the common light source includes a control branch. As a result, the other cores that receives an outgoing LIDAR signal from the same common light source can exclude the directional coupler 66, control waveguide 68, and control components 70 illustrated in FIG. 1A through FIG. 1C.

As is evident from FIG. 1A and FIG. 1B, the LIDAR system can optionally include one or more light signal amplifiers 446. For instance, an amplifier 446 can optionally be positioned along a utility waveguide as illustrated in the LIDAR system of FIG. 1A. In another example, an amplifier 446 is optionally positioned along all or a portion of the alternate waveguides 16 as illustrated in the LIDAR system of FIG. 1B. The electronics can operate the amplifier 446 so as to amplify the power of the outgoing LIDAR signal and accordingly of the system output signal. The electronics can operate each of the amplifiers 446 so as to amplify the power of the outgoing LIDAR signal. Suitable amplifiers 446 for use on the LIDAR chip, include, but are not limited to, Semiconductor Optical Amplifiers (SOAs).

The amplifiers 446 shown in FIG. 1A and FIG. 1B are each positioned before one of the splitters 24. In some instances, this location of the amplifiers 446 can cause saturation of one or more components selected from a group consisting of the first auxiliary light sensor 218, the second auxiliary light sensor 220, the first light sensor 223, and the second light sensor 224. For instance, the amplifier 446 can increase power level of the reference signal to a level where saturation occurs. A beam dump can be used to reduce the power level of the reference signal to a level where saturation is reduced or eliminated.

As is evident from FIG. 3B, FIG. 3D, and FIG. 3E, the LIDAR system can optionally include one or more electrical signal amplifiers 447. Each of the amplifiers 447 is positioned so as to provide amplification of a first data signal traveling between a first light sensor such as a first balanced detector 225 and an analog to digital converter or a second data signal traveling between a second light sensor such as a second balanced detector 226 and an analog to digital converter. Although FIG. 3D illustrates each of the electrical signal amplifiers 447 positioned along a first data line 228 or a second data line 232, the electrical signal amplifiers 447 can be positioned along a common data line 273 or a second common data line 275. Although FIG. 3E illustrates each of the electrical signal amplifiers 447 positioned along a common data line 273 or a second common data line 275, the electrical signal amplifiers 447 can be positioned along a first data line 228 or a second data line 232. Suitable electrical signal amplifiers 447 include, but are not limited to, Transimpedance Amplifiers (TIAs).

Figure 8:
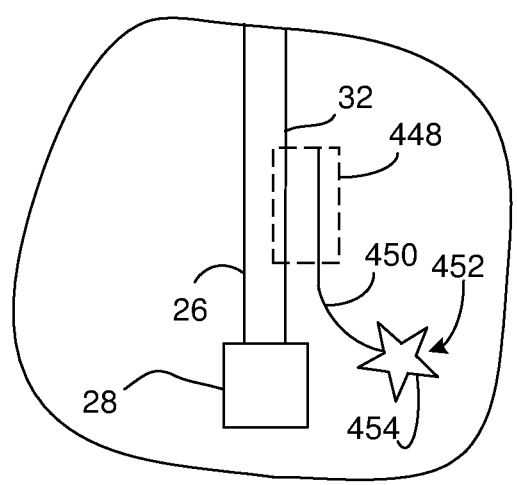
FIG. 8 illustrates a portion of a LIDAR chip that includes a reference waveguide used in conjunction with a beam dump.

FIG. 8 illustrates a portion of a LIDAR chip that includes a reference waveguide 32 used in conjunction with a beam dump configured to reduce the power level of the reference signal carried on the reference waveguide 32. The reference waveguide 32 carries the reference signal to a splitter 448 that moves a portion of the reference signal from the reference waveguide 32 onto a dump waveguide 450 as a dump signal. The dump waveguide 450 carries the dump signal to a beam dump 452.

The beam dump 452 is configured to scatter the dump signal without reflecting a substantial amount of the light from the dump signal back into the dump waveguide 450. For instance, the beam dump 452 can be a recess 454 etched into the light-transmitting medium of a silicon-on-insulator wafer to a depth where the dump signal is incident on one or more lateral sides of the recess 454. The recess 454 can be shaped so as to cause scattering of the dump signal. For instance, the recess 454 can have the shape of a star, or can include any number of irregularly positioned lateral sides. In some instances, the recess 454 can extends through the light transmitting to medium to an underlying layer such as the buried layer of a silicon-on-insulator wafer.

The splitter 448 can be constructed so as to control the percentage of the reference signal power transferred to the dump waveguide. Increasing the percentage of the reference signal power transferred to the dump waveguide increases attenuation of the power of reference signal and accordingly decreases the power of the signals received by all or a portion of the light sensors selected from a group consisting of the first auxiliary light sensor, the second auxiliary light sensor, the first light sensor, and the second light sensor. The drop in power of the light signals received by all or a portion of the light sensors reduces the opportunity for saturation. Suitable splitters 448 include, but are not limited to, 1×2 splitters including optical couplers, y-junctions, and MMIs. In some instances, the splitters 448 is configured such that percentage of the reference signal power transferred to the dump waveguide 450 is greater than or equal to 0.1%, 0.5%, or 1% and less than or equal to 2%, 10%, or 20%.

Light sensors that are interfaced with waveguides on a LIDAR chip can be a component that is separate from the chip and then attached to the chip. For instance, the light sensor can be a photodiode, or an avalanche photodiode. Examples of suitable light sensor components include, but are not limited to, InGaAs PIN photodiodes manufactured by Hamamatsu located in Hamamatsu City, Japan, or an InGaAs APD (Avalanche Photo Diode) manufactured by Hamamatsu located in Hamamatsu City, Japan. These light sensors can be centrally located on the LIDAR chip. Alternately, all or a portion the waveguides that terminate at a light sensor can terminate at a facet located at an edge of the chip and the light sensor can be attached to the edge of the chip over the facet such that the light sensor receives light that passes through the facet. The use of light sensors that are a separate component from the chip is suitable for all or a portion of the light sensors selected from the group consisting of the first light sensor and the second light sensor.

As an alternative to a light sensor that is a separate component, all or a portion of the light sensors can be integrated with the chip. For instance, examples of light sensors that are interfaced with ridge waveguides on a chip constructed from a silicon-on-insulator wafer can be found in Optics Express Vol. 15, No. 21, 13965-13971 (2007); U.S. Pat. No. 8,093,080, issued on Jan. 10, 2012; U.S. Pat. No. 8,242,432, issued Aug. 14, 2012; and U.S. Pat. No. 6,108, 472, issued on Aug. 22, 2000 each of which is incorporated herein in its entirety. The use of light sensors that are integrated with the chip are suitable for all or a portion of the light sensors selected from the group consisting of the first light sensor and the second light sensor.

Suitable electronics 62 for use in the LIDAR system can include, but are not limited to, a controller that includes or consists of analog electrical circuits, digital electrical circuits, processors, microprocessors, digital signal processors (DSPs), Application Specific Integrated Circuits (ASICs), computers, microcomputers, or combinations suitable for performing the operation, monitoring and control functions described above. In some instances, the controller has access to a memory that includes instructions to be executed by the controller during performance of the operation, control and monitoring functions. Although the electronics are illustrated as a single component in a single location, the electronics can include multiple different components that are independent of one another and/or placed in different locations. Additionally, as noted above, all or a portion of the disclosed electronics can be included on the chip including electronics that are integrated with the chip.

Components on the LIDAR chip can be fully or partially integrated with the LIDAR chip. For instance, the integrated optical components can include or consist of a portion of the wafer from which the LIDAR chip is fabricated. A wafer that can serve as a platform for a LIDAR chip can include multiple layers of material. At least a portion of the different layers can be different materials. As an example, a silicon-on-insulator wafer that includes the buried layer 300 between the substrate 302 and the light-transmitting medium 304 as shown in FIG. 4. The integrated on-chip components can be formed by using etching and masking techniques to define the features of the component in the light-transmitting medium 304. For instance, the slab 318 that define the waveguides and the stop recess can be formed in the desired regions of the wafer using different etches of the wafer. As a result, the LIDAR chip includes a portion of the wafer and the integrated on-chip components can each include or consist of a portion of the wafer. Further, the integrated on-chip components can be configured such that light signals traveling through the component travel through one or more of the layers that were originally included in the wafer. For instance, the waveguide of FIG. 4 guides light signal through the light-transmitting medium 304 from the wafer. The integrated components can optionally include materials in addition to the materials that were present on the wafer. For instance, the integrated components can include reflective materials and/or a cladding.

Numeric labels such as first, second, third, etc. are used to distinguish different features and components and do not indicate sequence or existence of lower numbered features. For instance, a second component can exist without the presence of a first component and/or a third step can be performed before a first step. The light signals disclosed above each include, consist of, or consist essentially of light from the prior light signal(s) from which the light signal is derived. For instance, an incoming LIDAR signal includes, consists of, or consists essentially of light from the LIDAR input signal.

Although the LIDAR system is disclosed as using complex signals such as the complex data signal, the LIDAR system can also use real signals. As a result, the mathematical transform can be a real transform and the components associated with the generation and use of the quadrature components can be removed from the LIDAR system. As a result, the LIDAR system can use a single signal combiner. Additionally or alternately, a single light sensor can replace each of the balanced detectors.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An imaging system, comprising:
a photonic circuit chip that includes multiple cores that each includes an optical switch and multiple alternate waveguides, the optical switch in each core configured to direct an outgoing light signal to any one of the alternate waveguides, the alternate waveguide to which the outgoing light signal is directed being an active waveguide;
each LIDAR core being configured to output the outgoing LIDAR signal from the active waveguide concurrently with the active waveguide receiving an incoming LIDAR signal;
the incoming LIDAR signal including light that is from the outgoing LIDAR signal, has exited from the imaging system, and returned to the LIDAR system;
each core including an optical splitter configured to receive the outgoing LIDAR signal and the incoming LIDAR signal,
the optical splitter extracting a portion of the outgoing LIDAR signal to serve as a reference signal and a portion of the incoming LIDAR signal to serve as a comparative signal;
each core including a signal combiner configured to combine light from the reference signal with light from the comparative signal so as to generate a composite signal beating at a beat frequency; and electronics use the beat frequency of the composite signal generated by the core to calculate a radial velocity and/or distance between one or more objects located outside of the imaging system and the imaging system.

2. The imaging system of claim 1, wherein the photonic circuit chip is constructed on a silicon-on-insulator platform.

3. The imaging system of claim 1, wherein the signal splitter is positioned along the active waveguide such that so the portion of the outgoing LIDAR signal that serve as the reference signal is extracted from the active waveguide and the portion of the incoming LIDAR signal that serves as the comparative signal is extracted from the active waveguide.

4. The imaging system of claim 3, wherein the splitter is one of multiple splitters included in each of the cores and one of the signal splitter is positioned along each of the alternate waveguides.

5. The imaging system of claim 4, wherein the electronics convert the composite signal to a electrical data signal, an electrical multiplexer is in electrical communication with multiple different first data lines and is configured to receive the electrical data signal from one of the first data lines and to output the electrical data signal on a common data line.

6. The imaging system of claim 5, wherein the first data line from which the electrical multiplexer receives the electrical data signal changes in response to changes in the alternate waveguide to which the outgoing LIDAR signal is directed.

7. The imaging system of claim 6, wherein the electronics include an analog-to-digital converter that receives the electrical data signal from the common data line.

8. The imaging system of claim 1, wherein the optical switch receives the outgoing LIDAR signal from a utility waveguide and the signal splitter is positioned along the utility waveguide so the portion of the outgoing LIDAR signal that serve as the reference signal is extracted from the utility waveguide and the portion of the incoming LIDAR signal that serves as the comparative signal is extracted from the utility waveguide.

9. The imaging system of claim 8, wherein the LIDAR chip is configured such that the outgoing LIDAR signal from each core is output from the LIDAR chip so as to serve as a LIDAR output signal and a lens receives the LIDAR output signals from different cores.

10. The imaging system of claim 4, wherein the electronics convert the composite signal to an electrical data signal, the electrical data signal being an electrical representation of the composite signal.

11. The imaging system of claim 10, wherein multiple different data lines are configured to receive the electrical data signal and the data line which receives the electrical data signal changes in response to changes in the alternate waveguide to which the outgoing LIDAR signal is directed.

12. The imaging system of claim 11, wherein the electrical data signals carried on different data lines are each associated with a different channel and a common data line receives the electrical data signals from the different data lines such that the electrical data signals associated with different channels are serially carried on the common data line.

13. The imaging system of claim 12, wherein an electrical multiplexer is in electrical communication with the data lines and is configured to output the electrical data signal on the common data line.

14. The imaging system of claim 12, wherein the common data line is directly connected to each of the different data lines at a node.

15. The imaging system of claim 14, wherein each of the cores includes a reference waveguide that carries the reference signal and an optical attenuator is positioned along each of the reference waveguides.

16. The imaging system of claim 14, wherein the electronics operate the attenuators such that a portion of the reference signals carried on different reference waveguides are attenuated while another portion of the reference signals carried on different reference waveguides are not attenuated.

17. The imaging system of claim 14, wherein the reference signals in the portion of the reference signals that are each attenuated are attenuated in response to the reference signal not being combined with the comparative signal.

* * * * *